United States Patent
Liang et al.

(10) Patent No.: US 8,773,744 B2
(45) Date of Patent: Jul. 8, 2014

(54) LIGHT MODULATING CELL, DEVICE AND SYSTEM

(75) Inventors: Rong-Chang Liang, Cupertino, CA (US); Ming-Wei Tsai, Taoyuan Hsien (TW); Ming-Hai Chang, Taoyuan Hsien (TW); Ching-Tung Hsu, Taoyuan Hsien (TW); Chia-Yen Lee, Taoyuan Hsien (TW); Keh-Su Chang, Taoyuan Hsien (TW)

(73) Assignee: Delta Electronics, Inc., Taoyuan Hsien (TW)

( * ) Notice: Subject to any disclaimer, the term of this patent is extended or adjusted under 35 U.S.C. 154(b) by 688 days.

(21) Appl. No.: 13/016,384

(22) Filed: Jan. 28, 2011

(65) Prior Publication Data

US 2012/0194563 A1    Aug. 2, 2012

(51) Int. Cl.
  *G02B 26/02* (2006.01)
  *G02F 1/03* (2006.01)
  *G02F 1/29* (2006.01)

(52) U.S. Cl.
  USPC ............................ 359/228; 359/253; 359/320

(58) Field of Classification Search
  USPC .............. 359/226.3, 228, 245, 253, 254, 266, 359/290, 316, 320, 665; 345/84, 107
  See application file for complete search history.

(56) References Cited

U.S. PATENT DOCUMENTS

| | | | |
|---|---|---|---|
| 6,275,254 B1 | 8/2001 | Beeteson et al. | |
| 6,369,954 B1 | 4/2002 | Berge et al. | |
| 7,298,559 B2 | 11/2007 | Kato et al. | |
| 7,443,596 B1 | 10/2008 | Berge | |
| 7,548,377 B2 | 6/2009 | Berge | |
| 7,570,434 B2 | 8/2009 | Kuiper et al. | |
| 7,688,509 B2 | 3/2010 | Vissenberg et al. | |
| 7,701,642 B2 | 4/2010 | Obinata | |
| 8,014,054 B2 * | 9/2011 | Lo et al. ......................... | 359/253 |
| 8,287,708 B2 * | 10/2012 | Fan et al. ....................... | 204/450 |
| 2009/0147372 A1 | 6/2009 | Chang | |
| 2009/0252485 A1 | 10/2009 | Tsuchiya | |
| 2009/0257111 A1 | 10/2009 | Heikenfeld et al. | |
| 2009/0303605 A1 | 12/2009 | Kirita | |
| 2010/0079873 A1 | 4/2010 | Wang et al. | |
| 2010/0157026 A1 | 6/2010 | Reichelt | |
| 2010/0214634 A1 | 8/2010 | Kroll et al. | |
| 2010/0225986 A1 | 9/2010 | Missbach | |

OTHER PUBLICATIONS

López et al, "Electrochemically activated adaptive liquid lens," Applied Physics Letters, Sep. 20, 2005, pp. 134102-1-134102-3, vol. 87.
Kuiper, S. et al., "Variable-focus liquid lens for miniature cameras." Applied Physics Letters, Aug. 16, 2004, pp. 1128-1130, vol. 85, No. 7.
Hayes Robert A., "Video-speed electronic paper based on electrowetting." Letters to Nature, Sep. 25, 2003, pp. 383-385, vol. 425.

* cited by examiner

*Primary Examiner* — Tuyen Tra
(74) *Attorney, Agent, or Firm* — Muncy, Geissler, Olds & Lowe, P.C.

(57) ABSTRACT

A 3D image display system with high resolution is disclosed. The system may deflect left and right eye images to a left and right eye of a viewer, respectively. As such, the viewer can see 3D images. With a time-sharing mode, all of electronically switchable light modulating cells are configured to modulate all of the images deflected to the left eye of the viewer during a first period, and modulate all of the images to the right eye of the viewer during a second period, and the first period and the second period are alternate periods. Alternatively, a part of the electronically switchable light modulating cells are configured to modulate left eye images deflected to the left eye of the viewer, and another part of the electronically switchable light modulating cells are configured to modulate right eye images to the right eye of the viewer during the same period.

57 Claims, 37 Drawing Sheets

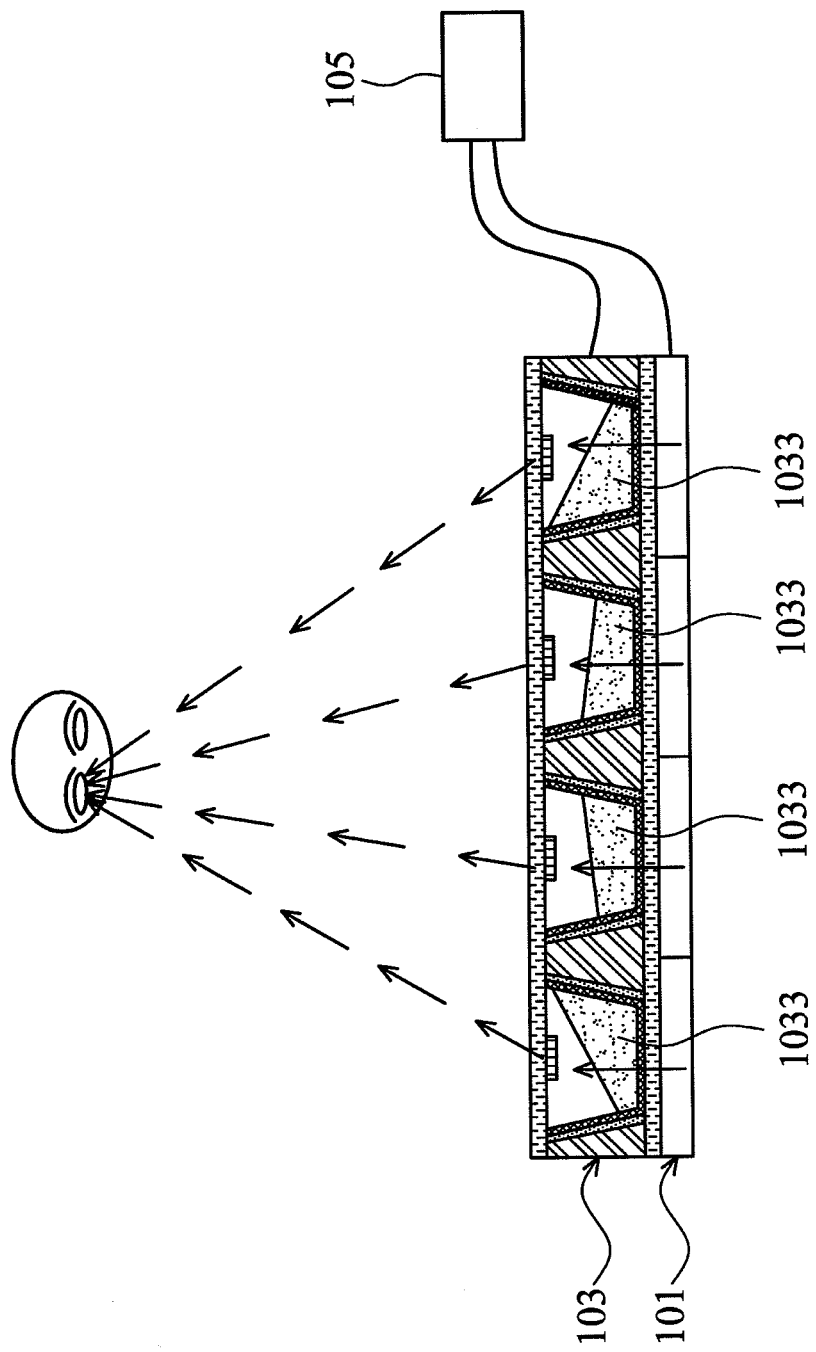

LIGHT MODULATING CELL, DEVICE AND SYSTEM

BACKGROUND OF THE INVENTION

1. Field of the Invention

The present invention relates to a three dimensional (3D) image display system, and in particular relates to a naked-eye type 3D image display system, an image display device, and electronically switchable light modulating cells thereof.

2. Description of the Related Art

In Nature 425, 383 (2003), Hayes et al. discloses a novel on/off switch method, which applies electrowetting principle to control colored oils. This technology had several advantages such as high color saturation, high image response speed, and low energy consumption, as compared to conventional technologies. Therefore, electrowetting was soon applied in display technology field.

In Applied Physics Letters 85, page 1128 (2004), S. Kuiper et al. published a paper titled "Variable-Focus Liquid Lens for Miniature Cameras" that described an optical lens, where an input voltage is used to tune a curvature ratio of an interface between two incompatible fluids. By changing the input voltage, a variable-focus liquid lens for miniature cameras is achieved.

In related arts, liquid lenses made of mini-scaled capillary array devices are manufactured by micro-electro-mechanical system (MEMS) processes. The capillary surface may be an interface between a gas and a liquid or between two liquids, and the shape of the interface is determined by surface tension of the liquids. In Applied Physics Letters 87, pp. 134102 (2005), Hirsa et al. published a paper titled "Electrochemically Activated Adaptive Liquid Lens", where a reversible capillary switch having low energy consumption is formed on a single chip. The capillary switch scaling from mini meters to micro meters is arranged in a single mode or in an array mode. The capillary switch that controls a droplet interface shape has been applied in near and far field optics, data access systems, near field lithography systems, microscopy, and surface shape manufacturing systems.

Displays capable of showing stereoscopic images or animations are called three-dimensional (3D) image displays. Major developments in the 3D display fields have led to two types of technologies: a polarized glasses type and a naked-eye type. Meanwhile, 3D display effects may also be theoretically accomplished by using holography. However, holography needs interference of several light beams to display 3D images.

Because the naked eye type 3D display only utilizes a light beam control element in front of a display, it is relatively easy to display 3D images, as compared to the holography. The light beam control element is generally a barrier layer or a lenticular lens that controls or changes deflection angles of light beams. As such, right eye images are deflected to a right eye of a viewer, and left eye images are deflected to a left eye of the viewer, respectively.

In U.S. Pat. No. 6,275,254 (titled "AUTO-STEROSCOPIC DISPLAY DEVICE AND SYSTEM") discloses a 3D image display, which solves the problem of narrow view zones. A planar cathode tube radiation (CRT) display is collocated with a specific magnetic element on parts of vertical pixels of the CRT display to deflect electron beams, thereby controlling the pixels. Moreover, the other parts of the vertical pixels are collocated with lenticular lens screens. Although a multi-view display is achieved, a specific planar CRT is required.

U.S. Patent Publication No. 2010/0214634 (titled "Holographic Reconstruction System with an Optical Wave Tracking Means") describes a holographic reconstruction system which comprises a spatial light modulator, a light source, light-controlling cells, an eye finder, and a system controller (SC). The eye finder may search an eye position of a viewer, locate the eye position, and then transmit the location information back to the system controller. Thereafter, the system tunes an applied voltage to control the emitting direction of light beams from the light-controlling optic cells to display 3D images for a moving viewer. The light-controlling cells may be a control unit based on the electrowetting theory. However, the holographic reconstruction system which utilizes interference or holography images is not a lenticular lenses-based system that separates light beams into right eye light beams and left eye light beams to display 3D images.

U.S. Patent Publication No. 2010/0225986 (titled "Display Device with an Active Matrix of Electrowetting Cells") describes a display device driven by an active matrix, which includes at least one data driver circuit and at least one selection driver circuit. The active matrix is electrically connected to the at least one data driver circuit and the at least one selection driver circuit, and electrowetting cells are directly driven by the active matrix. However, the active matrix shields light beams and thus reduce the aperture ratio of the display device.

U.S. Pat. No. 6,369,954 (titled "LENS WITH VARIABLE FOCUS") discloses variable-focus lenses. As shown in FIG. 1, the variable-focus lenses includes a chamber 12 filled by a first liquid 13 and a second liquid 11 which contacts with a surface 15, and has an appearance of a droplet. The first liquid 13 and the second liquid 11 are transparent and incompatible, and have different refractive indexes. An electrode 16, plated on an outer surface of the chamber 12, surrounds the contact surface 15. The electrode 16 connects to an electrode 17, which contacts the first liquid 13. The first liquid 13 and the second liquid 11 have different properties with respect to electrowetting, such that the curvature ratio of the interface between the first liquid 13 and the second liquid 11 is changed by applying a voltage. FIG. 1 shows a change from a curvature ratio A to a curvature ratio B. It is noted that by changing the interface curvature ratio, the focal length of the lenses may be tuned without tuning other factors of the lenses.

U.S. Pat. No. 7,688,509 (titled "AUTOSTEREOSCOPIC DISPLAY") discloses that liquid lenses are collocated with splitting screens to display 3D images. As shown in FIGS. 2A and 2B, the electrodes in an electrowetting cell include side electrodes and a bottom electrode, and fluids in the electrowetting cell include incompatible oil 73 and water 74. The electrowetting lens 71 is operable by applying different voltages to the side electrodes and the bottom electrode, such that a curvature ratio of the interference of the two incompatible fluids is tuned to modulate the emission directions of light beams traveling therethrough. As shown in FIGS. 2A and 2B, the electrowetting lens 72 is another device, which tunes the emission direction of light beams traveling therethrough. Different voltages are applied to the left and right side electrodes and the bottom electrode to tune an inclined angle of the interface of the incompatible fluids, thereby modulating the emission direction of the light beams traveling therethrough.

In U.S. Patent Publication No. 2009/0257111, a tunable optical array device includes a substrate on which a TFT tuning circuitry is disposed for controlling an upper layered cell array. Two incompatible fluids having different polarities are filled in cells of the cell array, and the shape of the interface between the fluids is controlled by lower layered TFT tuning circuitry. Accordingly, phase modulation and beam deflection of light beams traveling through the cell array can be controlled. Also disclosed are driving methods of the TFT tuning circuitry. However, using a TFT driving mechanism may dramatically reduce the aperture ratio of the display. While an interconnect layer is also disclosed, the brightness of the display is reduced by the multi-layered structure of the interconnect layer.

In U.S. Patent Publication No. 2009/0257111, an electrowetting display having multiple cells is applied in a holographic reconstruction system. Interference fringes of light beams are generated through the electrowetting cells. The electrowetting display may deflect the light beams traveling therethrough to the eyes of a viewer. Although the electrowetting display may deflect light beams, it lacks the concept of time-multiplexing. The electrowetting device can be applied in retro-reflective panels, image projection devices, and holographic projection reconstructing equipments.

In U.S. Patent Publication No. 2010/0157026 (titled "DIRECTIONAL ILLUMINATION UNIT FOR AUTOSTEREOSCOPIC DISPLAYS"), a 3D image display includes a light emitting device, an image device, a light beam deflection device, an image display device, a viewer tracker, and an image control circuit. The light emitting device can be a surface emitting diode or a backlight. The image display device can be a spherical mirror, an aspherical mirror, a holographic optical element, or an interference optical element. The light beam deflection device can be electrowetting elements. The image display device has pixel structures, which can be simultaneously modulated to display a discrete different image series. As such, a viewer may view 2D or 3D images. The viewer tracker includes a detection mechanism which detects viewer position. The light emitting device emits light beams which travel through the image device as parallel light beams, holographic images, or optical interference images. The parallel light beams or the like deflected by the light beam deflection device would travel to the image display device for simultaneously modulating separate image arrays. The system does not process images by persistence of vision, and it does not process separate image arrays. Also, the optical path design of the system is relatively complicated.

Therefore, a novel 3D image display is desirable, which simultaneously modulate focal length and emission light beam direction of relatively large display areas.

BRIEF SUMMARY OF THE INVENTION

One embodiment of the disclosure provides an electronically switchable light modulating cell, comprising: a first substrate; a spacer disposed on the first substrate; a second substrate disposed on the spacer and opposite to the first substrate, wherein the first substrate, the second substrate and the spacer define a compartment; a first electrode disposed on a portion of the spacer; a second electrode disposed on another portion of the spacer; a third electrode disposed on the second substrate; a dielectric layer formed on the first and second electrodes; a high-contact-angle material layer formed on the dielectric layer; and a first light modulating medium filled in the compartment and adapted to adjust the directions of light beams traveling from the first substrate to the second substrate in accordance with an electric potential difference across the first, second and third electrodes, so that the light beams alternately arrive at either the left eye or the right eye of a viewer to form a stereoscopic image perceivable to the viewer.

One embodiment of the disclosure provides an image display device, comprising: a first substrate; a pair of first electrodes disposed on the first substrate; a pair of second electrodes disposed on the first substrate; a dielectric layer, formed on the first substrate, covering the pair of first electrodes and the pair of second electrodes; a high-contact-angle material layer formed on the dielectric layer; a spacer disposed on the high-contact-angle material layer; a second substrate disposed on the spacer and opposite to the first substrate, wherein the high-contact-angle material layer, the second substrate and the spacer define a first compartment and a second compartment; a third electrode formed on the second substrate in the first compartment; a forth electrode formed on the second substrate in the second compartment; a first light modulating medium filled in the first compartment and adapted to adjust the directions of light beams traveling from the first substrate to the second substrate in accordance with an electric potential difference across the pair of first electrodes and the third electrode, so that the light beams arrive at the right eye of a viewer; and a second light modulating medium filled in the second compartment and adapted to adjust the directions of light beams traveling from the first substrate to the second substrate in accordance with another electric potential difference across the pair of second electrodes and forth electrode, so that the light beams arrive at the left eye of the viewer and, together with the light beams arriving at the right eye of the view, form a stereoscopic image perceivable to the viewer.

One embodiment of the disclosure provides an image display system, comprising: a display device having a plurality of pixels; a light modulating device, attached to the display device, comprising a plurality of electronically switchable light modulating cells; and a system controller electrically connected to the display device and the light modulating device, wherein the system controller is configured to enable synchronization between the display device and the light modulating device so that light beams originated from the display device are modulated by the plurality of electronically switchable light modulating cells to form a stereoscopic image perceivable to a viewer.

One embodiment of the disclosure provides an electronically switchable light modulating cell, comprising: a first substrate; a pair of first electrodes disposed on the first substrate, the polarity of one of the pair being different from the polarity of the other; a dielectric layer formed on the first substrate and the pair of first electrodes; a high-contact-angle material layer formed on the dielectric layer; a spacer disposed on the high-contact-angle material layer; a second substrate disposed on the spacer and opposite to the first substrate, wherein the high-contact-angle material layer, the second substrate and the spacer define a compartment; and a first light modulating medium filled in the compartment and adapted to adjust the directions of light beams traveling from the first substrate to the second substrate in accordance with an electric potential difference across the pair of electrodes and the second electrode, so that the light beams alternately arrive at either the left eye of a viewer or the right eye of the viewer to form a stereoscopic image perceivable to the viewer.

One embodiment of the disclosure provides An electronically switchable light modulating cell, comprising: a first substrate; a pair of first electrodes disposed on the first substrate, wherein at least one of the pair of electrodes is wave-shaped; a dielectric layer formed on the first substrate and the pair of first electrodes; a high-contact-angle material layer formed on the dielectric layer; a spacer disposed on the high-contact-angle material layer; a second substrate disposed on the spacer and opposite to the first substrate, wherein the high-contact-angle material layer, the second substrate and the spacer define a compartment; a second electrode disposed on the second substrate; and a light modulating medium filled in the compartment and adapted to adjust the directions of light beams traveling from the first substrate to the second substrate in accordance with an electric potential difference across the pair of first electrodes and the second electrode, so that the light beams alternately arrive at either the left eye of a viewer or the right eye of the viewer to form a stereoscopic image perceivable to the viewer.

One embodiment of the disclosure provides An electronically switchable light modulating cell, comprising: a first substrate; a pair of first electrodes disposed on the first substrate; a dielectric layer formed on the first substrate and the pair of first electrodes; a spacer disposed on the dielectric layer; a second substrate disposed on the spacer and opposite to the first substrate, wherein the dielectric layer, the second substrate and the spacer define a compartment; and a light modulating medium filled in the compartment and adapted to adjust the directions of light beams traveling from the first substrate to the second substrate in accordance with an electric potential difference across the pair of first electrodes, so that the light beams alternately arrive at either the left eye of a viewer or the right eye of the viewer to form a stereoscopic image perceivable to the viewer.

One embodiment of the disclosure provides an electronically switchable light modulating cell, comprising: a first substrate; a spacer disposed on the first substrate; a pair of first electrodes disposed on the first substrate, the polarity of one of the pair being different from the polarity of the other; a dielectric layer formed on the first substrate and the pair of first electrodes; a second substrate disposed on the spacer and opposite to the first substrate, wherein the dielectric layer, the second substrate and the spacer define a compartment; and a first light modulating medium filled in the compartment and adapted to adjust the directions of light beams traveling from the first substrate to the second substrate in accordance with an electric potential difference across the pair of first electrodes and the second electrode, so that the light beams alternately arrive at either the left eye of a viewer or the right eye of the viewer to form a stereoscopic image perceivable to the viewer.

One embodiment of the disclosure provides an electronically switchable light modulating cell, comprising: a first substrate; a pair of first electrodes disposed on the first substrate; a first dielectric layer formed on the first substrate and the pair of first electrodes; a spacer disposed on the first dielectric layer; a second dielectric layer disposed on the spacer, wherein the first dielectric layer, the second dielectric layer and the spacer define a compartment; a pair of second electrodes disposed on the second dielectric layer; a second substrate, disposed on the second dielectric layer, covering the pair of second electrodes; a third electrode disposed on a portion of the spacer; a forth electrode disposed on another portion of the spacer; and a light modulating medium filled in the compartment, wherein the light modulating medium is adapted to form a capillary droplet and to adjust the directions of light beams traveling from the first substrate to the second substrate in accordance with an electric potential difference across the first pair of electrodes, the second pair of electrodes, the third electrode and the forth electrode, so that the light beams alternately arrive at either the left eye of a viewer or the right eye of the viewer to form a stereoscopic image perceivable to the viewer.

One embodiment of the disclosure provides an electronically switchable light modulating cell, comprising: a first substrate; a pair of first electrodes disposed on the first substrate; a first dielectric layer formed on the first substrate and the pair of first electrodes; a first high-contact-angle material layer formed on the first dielectric layer; a spacer disposed on the first high-contact-angle material layer; a second high-contact-angle material layer disposed on the spacer, wherein the first high-contact-angle material layer, the second high-contact-angle material layer, and the spacer define a compartment; a second dielectric layer formed in the second high-contact-angle material layer; a pair of second electrodes disposed on the second dielectric layer; a second substrate, disposed on the second dielectric layer, covering the pair of second electrodes; a third electrode disposed on a portion of the spacer; a forth electrode disposed on another portion of the spacer; and a light modulating medium filled in the compartment, wherein the light modulating medium is adapted to form a capillary droplet and to adjust the directions of light beams traveling from the first substrate to the second substrate in accordance with an electric potential difference across the first pair of electrodes, the second pair of electrodes, the third electrode and the forth electrode, so that the light beams alternately arrive at either the left eye of a viewer or the right eye of the viewer to form a stereoscopic image perceivable to the viewer.

One embodiment of the disclosure provides an electronically switchable light modulating cell, comprising: a first electroactive polymer film; a spacer; a second electroactive polymer film opposite to the first electroactive polymer film, wherein the first electroactive polymer film, the second electroactive polymer film, and the spacer define a compartment; and a first light modulating medium filled in the compartment, wherein a shape of the compartment is adapted to adjust the directions of light beams traveling from the first electroactive polymer film to the second electroactive polymer film in accordance with an electric potential difference across the first electroactive polymer film and the second electroactive polymer film, so that the light beams alternately arrive at either the left eye of a viewer or the right eye of the viewer to form a stereoscopic image perceivable to the viewer.

One embodiment of the disclosure provides an electronically switchable light modulating cell, comprising: a first substrate and a second substrate disposed between two spacers; a pair of first electrodes disposed on the first substrate, the polarity of one of the pair being different from the polarity of the other; a dielectric layer formed on the first substrate and the pair of electrodes; a second electrode formed on the second substrate; a high-contact-angle material layer formed on the dielectric layer, wherein the high-contact-angle material layer, the second electrode and the spacers define a compartment; a first light modulating medium filled in the compartment and adapted to adjust the directions of light beams traveling from the first substrate to the second substrate in accordance with an electric potential difference across the pair of first electrodes and the second electrode, so that the light beams alternately arrive at either the left eye of a viewer or the right eye of the viewer to form a stereoscopic image perceivable to the viewer.

One embodiment of the disclosure provides an electronically switchable light modulating cell, comprising: a first substrate; a high-contact-angle material layer on the first substrate; a spacer disposed on the high-contact-angle material layer; a second substrate disposed on the spacer and opposite to the first substrate, wherein the high-contact-angle material layer, the second substrate and the spacer define a compartment; a first electrode disposed on a portion of the spacer; a second electrode disposed on another portion of the spacer; a third electrode disposed on the second substrate; a dielectric layer formed on the first and second electrodes; and a first light modulating medium filled in the compartment and adapted to adjust the directions of light beams traveling from the first substrate to the second substrate in accordance with an electric potential difference across the first, second and third electrodes, so that the light beams alternately arrive at either the left eye or the right eye of a viewer to form a stereoscopic image perceivable to the viewer.

One embodiment of the disclosure provides an image display device, comprising: a first substrate; a pair of first electrodes disposed on the first substrate; a pair of second electrodes disposed on the first substrate; a dielectric layer, formed on the first substrate, covering the pair of first electrodes and the pair of second electrodes; a spacer disposed on the dielectric layer; a second substrate disposed on the spacer and opposite to the first substrate, wherein the dielectric layer, the second substrate and the spacer define a first compartment and a second compartment; a first light modulating medium filled in the first compartment and adapted to adjust the directions of light beams traveling from the first substrate to the second substrate in accordance with an electric potential difference across the pair of first electrodes, so that the light beams arrive at the right eye of a viewer; and a second light modulating medium filled in the second compartment and adapted to adjust the directions of light beams traveling from the first substrate to the second substrate in accordance with another electric potential difference across the pair of second electrodes, so that the light beams arrive at the left eye of the viewer and, together with the light beams arriving at the right eye of the view, form a stereoscopic image perceivable to the viewer.

One embodiment of the disclosure provides an image display system, comprising: a display device having a plurality of pixels; a light modulating device, attached to the display device, comprising a plurality of electronically switchable light modulating cells; and a system controller electrically connected to the display device and the light modulating device, wherein the system controller is configured to enable synchronization between the display device and the light modulating device so that light beams originated from the display device are modulated by the plurality of electronically switchable light modulating cells to form a stereoscopic image perceivable to a viewer.

A detailed description is given through the following embodiments with reference to the accompanying drawings.

BRIEF DESCRIPTION OF THE DRAWINGS

The present invention can be more fully understood by reading the subsequent detailed description and examples with references made to the accompanying drawings, where:

FIG. 8A-8B show display types of the 3D image display system at time t1 and t2 in FIG. 3, respectively, according to one embodiment of the present invention;

DETAILED DESCRIPTION OF THE INVENTION

The following description is of the best-contemplated mode of carrying out the invention. This description is made for the purpose of illustrating the general principles of the present invention and should not be taken in a limiting sense. The scope of the present invention is best determined by reference to the appended claims.

The conventional lenticular lenses are static passive devices, unable to dynamically modulate directions of light beams. The conventional lenticular lenses also have limitation of visible areas of displays. The 3D image display device of the present invention may be used to replace the conventional lenticular lenses. In one embodiment, the light modulating medium interface of the display device is controlled by the electrowetting principle, such that the directions of emitting light beams can be dynamically modulated. The display device and the 3D light modulating device are configured to enable time-sharing and synchronization, thereby displaying the 3D images for viewers. Currently, 1 mm electrowetting displays have a refresh time of 3 ms to 10 ms, and 100 μm electrowetting displays have a refresh frequency of 1 kHz to 3 kHz. In general, smaller sized displays have faster driving speeds. If a display has a refresh frequency which is greater than 120 Hz, the display can be performed in the time-sharing mode.

Figure 1:
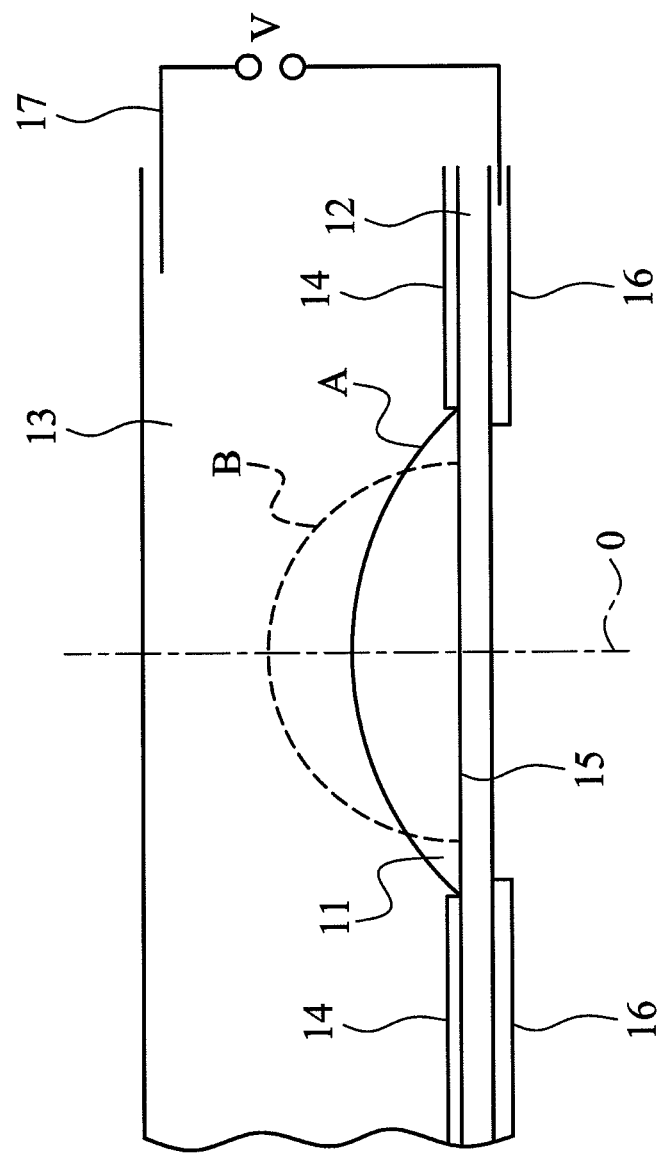
FIGS. 1 and 2A-2B are cross sections of conventional 3D image display devices according to related arts.
Figure 2B:
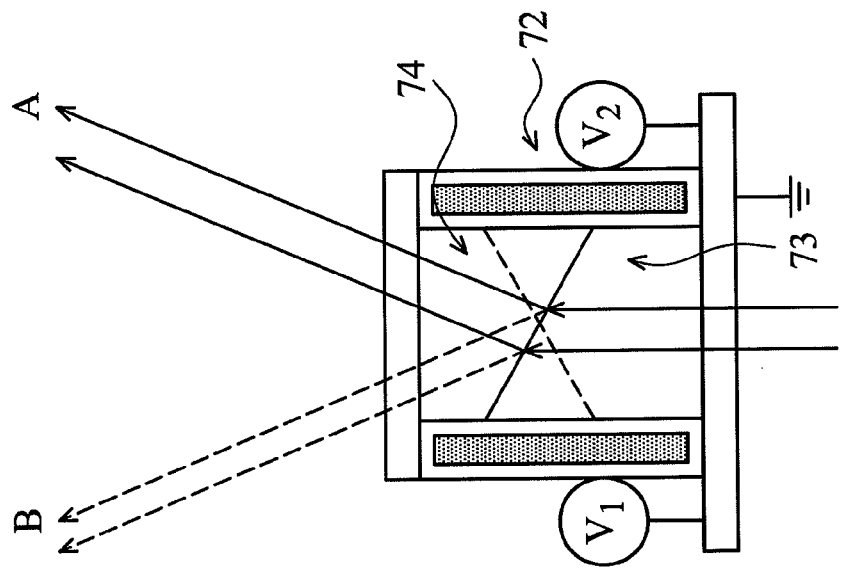
Figure 2A:
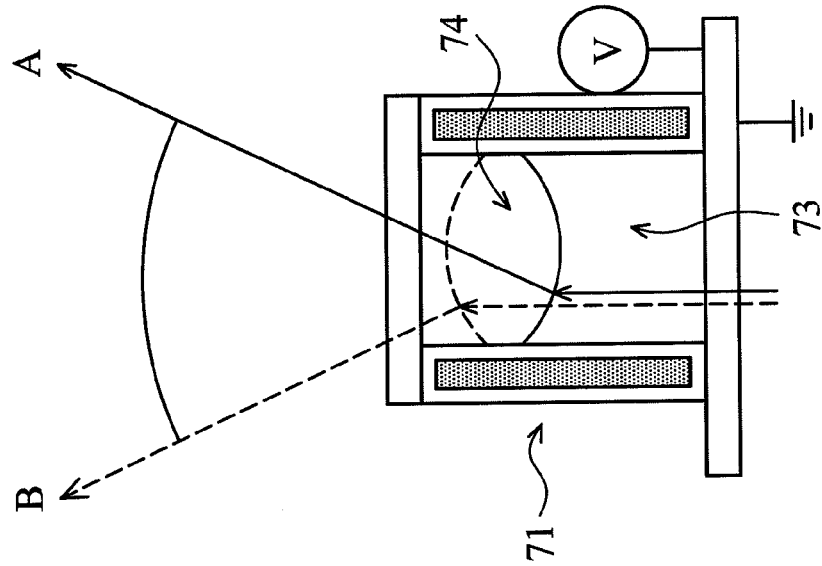
Figure 3:
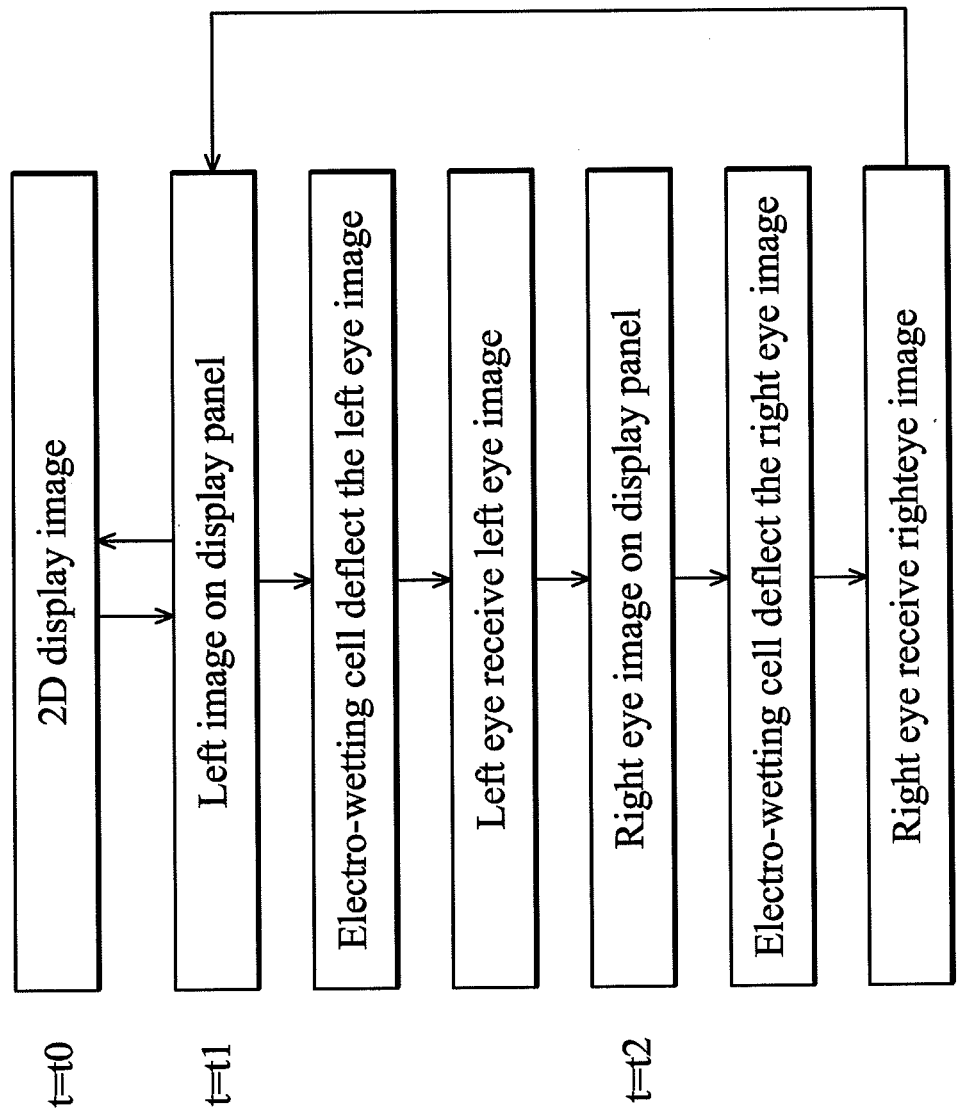
FIG. 3 shows a flow chart of a 3D image display system being driven by a time-sharing mode according to one embodiment of the present invention.

As shown in FIG. 3, the light modulating device is in a 2D mode at time t0, while a light modulating medium interface in the light modulating device is horizontal. As such, light beams traveling therethrough are not deflected, and the light modulating device displays the 2D images from a display device. At time t1, left eye images from the display device are deflected by electronically switchable light modulating cells of the 3D light modulating device, such that the left eye images may enter the left eye of a viewer. At time t2, right eye images from the display device are deflected by the electronically switchable light modulating cells, such that the right eye images may enter the right eye of a viewer. The above terms "right eye images" and "left eye images" mean that the light beams of the images which are perceivable to the right eye and left eye, respectively. The described 3D light modulating device utilizing the time-sharing concept, according to the present invention, may save at least 50%, of an area of a display device, and achieve high display quality.

According to embodiments of the present invention, the 3D light modulating device has a plurality of electronically switchable light modulating cells of specific shapes, sizes, and aspect ratios. The electronically switchable light modulating cells are arranged in an array and include at least one light modulating medium. When voltages are applied to electrodes of the electronically switchable light modulating cells, according to the electrowetting principle, the light modulating medium interface will be changed to a non-horizontal profile such as a concaved, convex, or slanted profile, thereby influencing the direction and/or focus of the light beams of the images.

Figure 4:
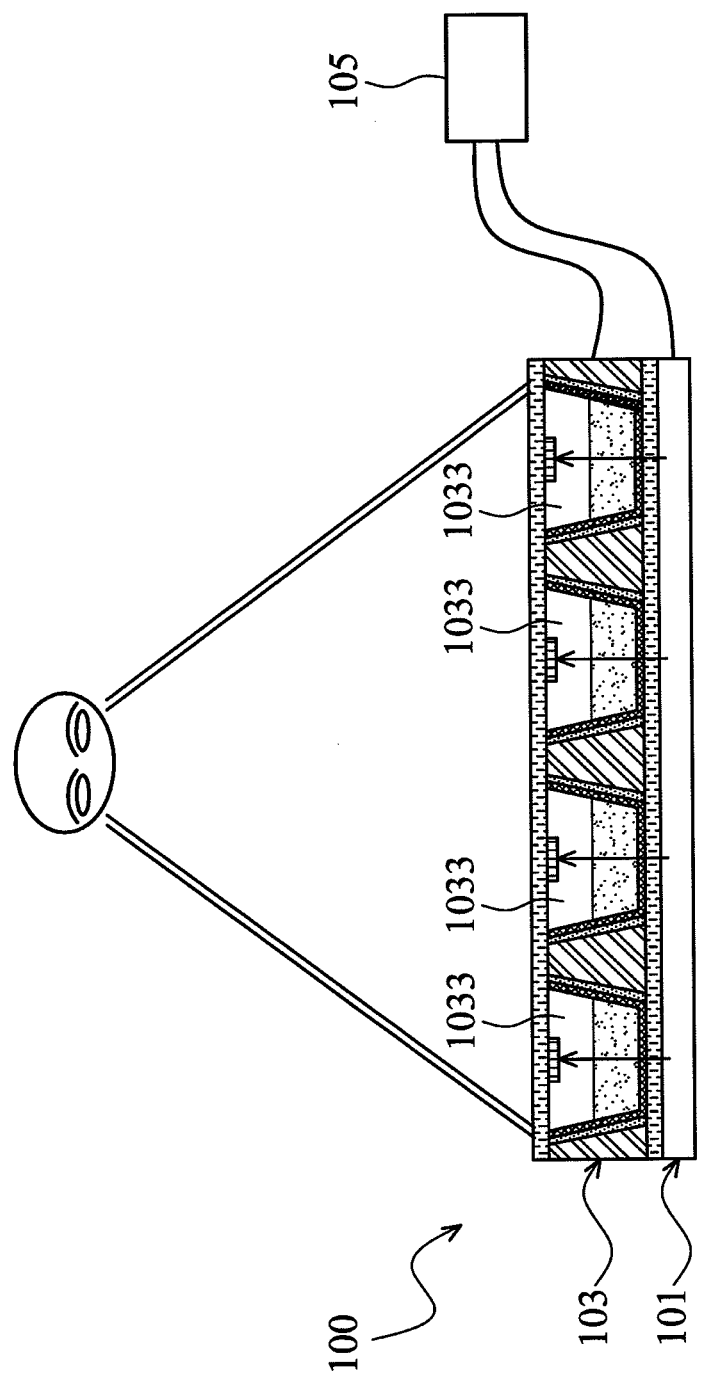
FIG. 4 shows a display type of the 3D image display system at time t0 in FIG. 3 according to one embodiment of the present invention.
Figure 5B:
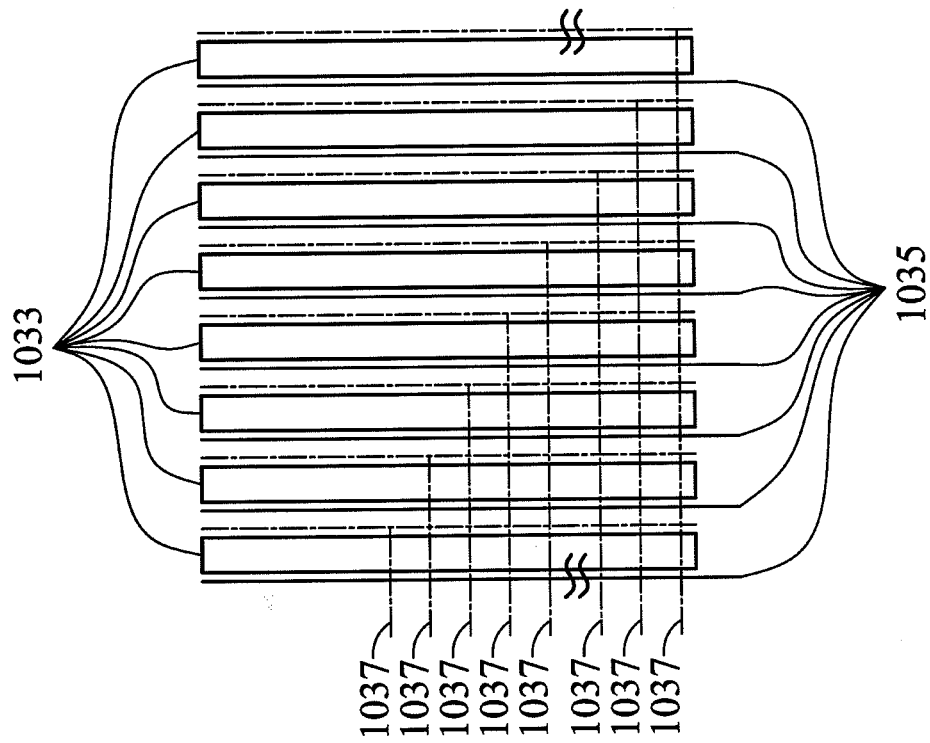
FIGS. 5A-5B and 6A-6B show arrangements of electrode lines for driving electronically switchable light modulating cells according to embodiments of the present invention.
Figure 5A:
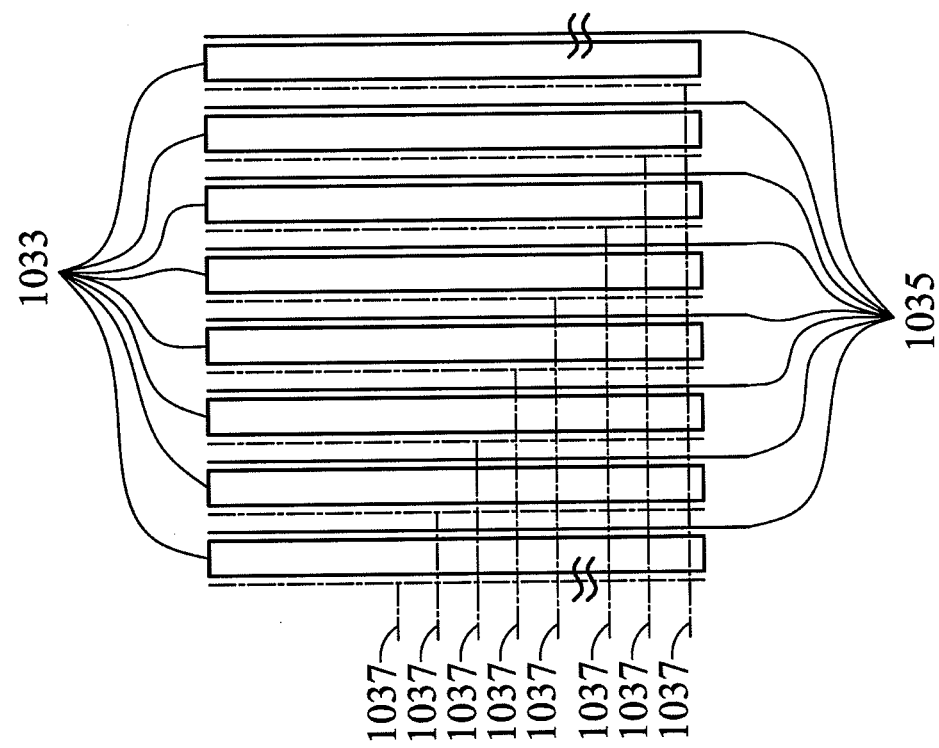
Figure 6B:
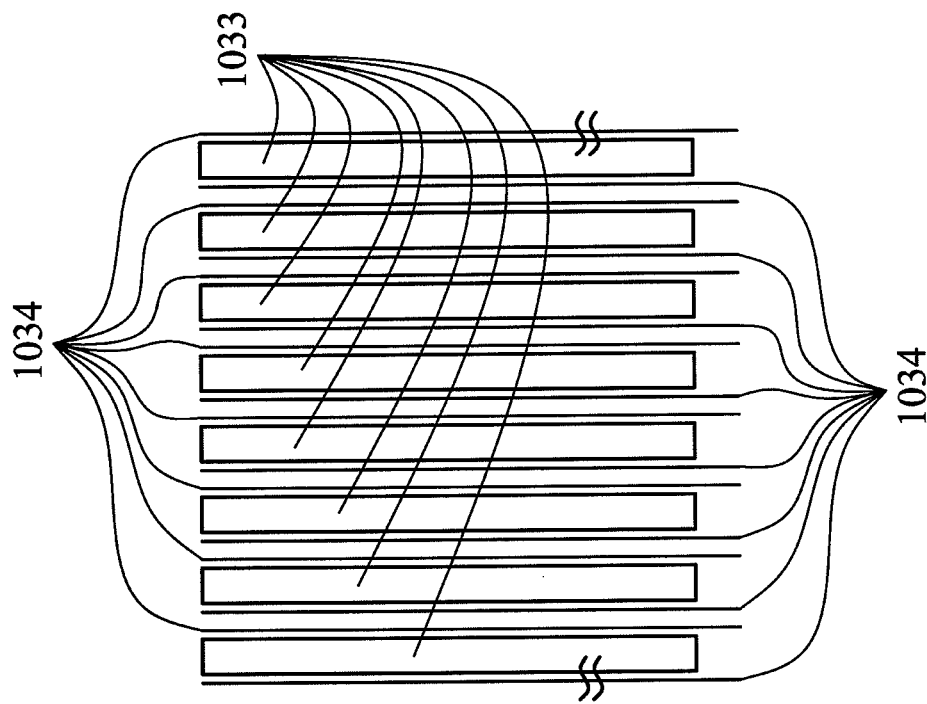
Figure 6A:
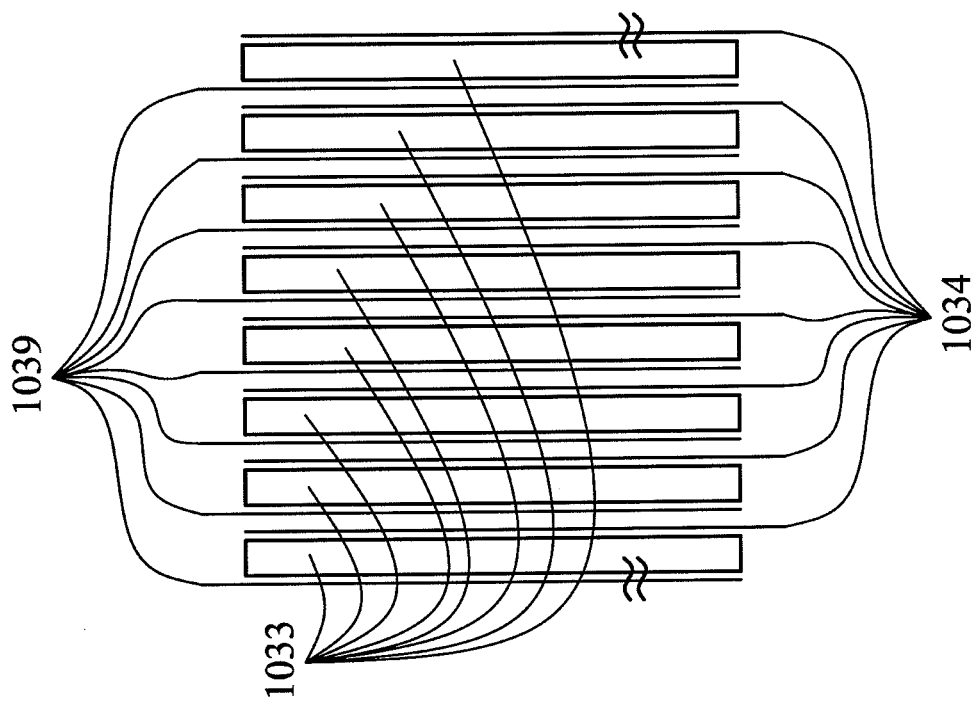

As shown in FIG. 4, the 3D image display system 100 includes a display device 101, a light modulating device 103, and a system controller 105. The display device 101 can be driven with a refresh frequency greater than 120 Hz. The light modulating device 103 is composed of a plurality of transparent electronically switchable light modulating cells 1033, which may deflect directions of light beams (from the display device 101) traveling therethrough. The display device 101 is collocated with the light modulating device 103, and each of the electronically switchable light modulating cells 1033 corresponds to at least one pixel of the display device 101. The light beams of the images from the display device 101 are deflected by the light modulating device 103 to form 3D images. The display device 101 can be an electronic paper, an electronic reader, Electroluminescent display (ELD), Organic electroluminescent display (OELD), Vacuum fluorescent display (VFD), Light emitting diode display (LED), Cathode ray tube (CRT), Liquid crystal display (LCD), Plasma display panel (PDP), Digital light processing (DLP) display, Liquid crystal on silicon (LCoS), Organic light-emitting diode (OLED), Surface-conduction electron-emitter display (SED), Field emission display (FED), Laser TV (Quantum dot laser; Liquid crystal laser), Ferro liquid display (FLD), Interferometric modulator display (iMoD), Thick-film dielectric electroluminescent (TDEL), Quantum dot display (QD-LED), Telescopic pixel display (TPD), Organic light-emitting transistor (OLET), Electrochromic display, Laser phosphor display (LPD), or the like. Preferably, the display device 101 includes Electroluminescent display (ELD), Organic electroluminescent display (OELD), Vacuum fluorescent display (VFD), Light emitting diode display (LED), Cathode ray tube (CRT), Liquid crystal display (LCD), Plasma display panel (PDP), Organic light-emitting diode (OLED), Surface-conduction electron-emitter display (SED), Field emission display (FED), Organic light-emitting transistor (OLET), and Laser phosphor display (LPD). According to an embodiment of the present invention, the light modulating device may be disposed between a projection screen and a Digital light processing (DLP) display or Liquid crystal on silicon (LCoS) display. Alternatively, the light modulating device may be disposed in front of a screen associated with a Digital light processing (DLP) display or a Liquid crystal on silicon (LCoS) display. The system controller 105 electrically connects to the display device 101 and the light modulating device 103, respectively, and is configured to enable synchronization between the display device 101 and the light modulating device 103. The light modulating device 103 can be driven by an active matrix, a passive matrix, or a segment-by-segment mechanism. The passive matrix performs multi-line addressing such as line-by-line or area-by-area addressing, or multi-domain addressing. The light modulating device is preferably driven by a simple passive matrix without TFTs, thereby increasing the aperture ratio of the 3D image display system 100. The passive matrix is driven by multi-line or the multi-domain addressing, such that designs of the conductive lines thereof are simple. For example, the designs may need only two layered connections (e.g., ITO) without a complicated layout, and the brightness of the 3D image display system 100 is not reduced by a complicated layout. In one embodiment of the present invention, the electronically switchable light modulating cells 1033 are rectangular-shaped as shown in FIGS. 5A, 5B, 6A, and 6B. The light beams traveling through the electronically switchable light modulating cells 1033 can be deflected toward a right and a left eye for forming the 3D images. For deflecting the light beams, the electrode lines 1035 and 1037 may be arranged as one dimensional array to drive the electronically switchable light modulating cells 1033. As shown in FIGS. 5A and 5B, the electrode lines 1035 and 1037 such as ITO in the passive matrix are arranged in two layers, respectively. As shown in FIGS. 6A and 6B, the electrode lines 1034 and 1039 in the passive matrix are arranged in the same layer. The electrode lines 1034 and 1039 may extend toward two opposite directions as shown in FIG. 6A. Alternatively, the electrode lines 1034 may extend toward the same direction as shown in FIG. 6B.

Figure 7:
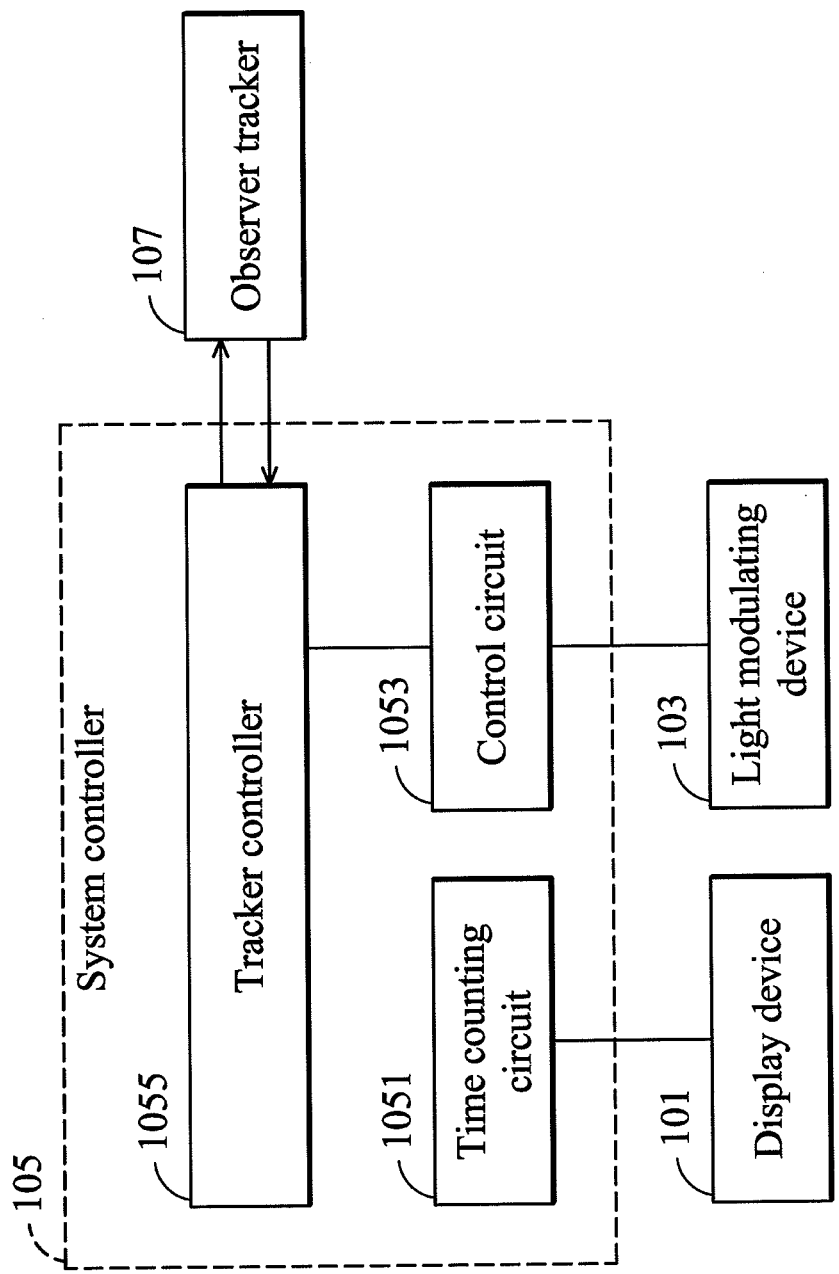
FIG. 7 is a block diagram of a 3D light modulating device according to one embodiment of the present invention.
Figure 8A:
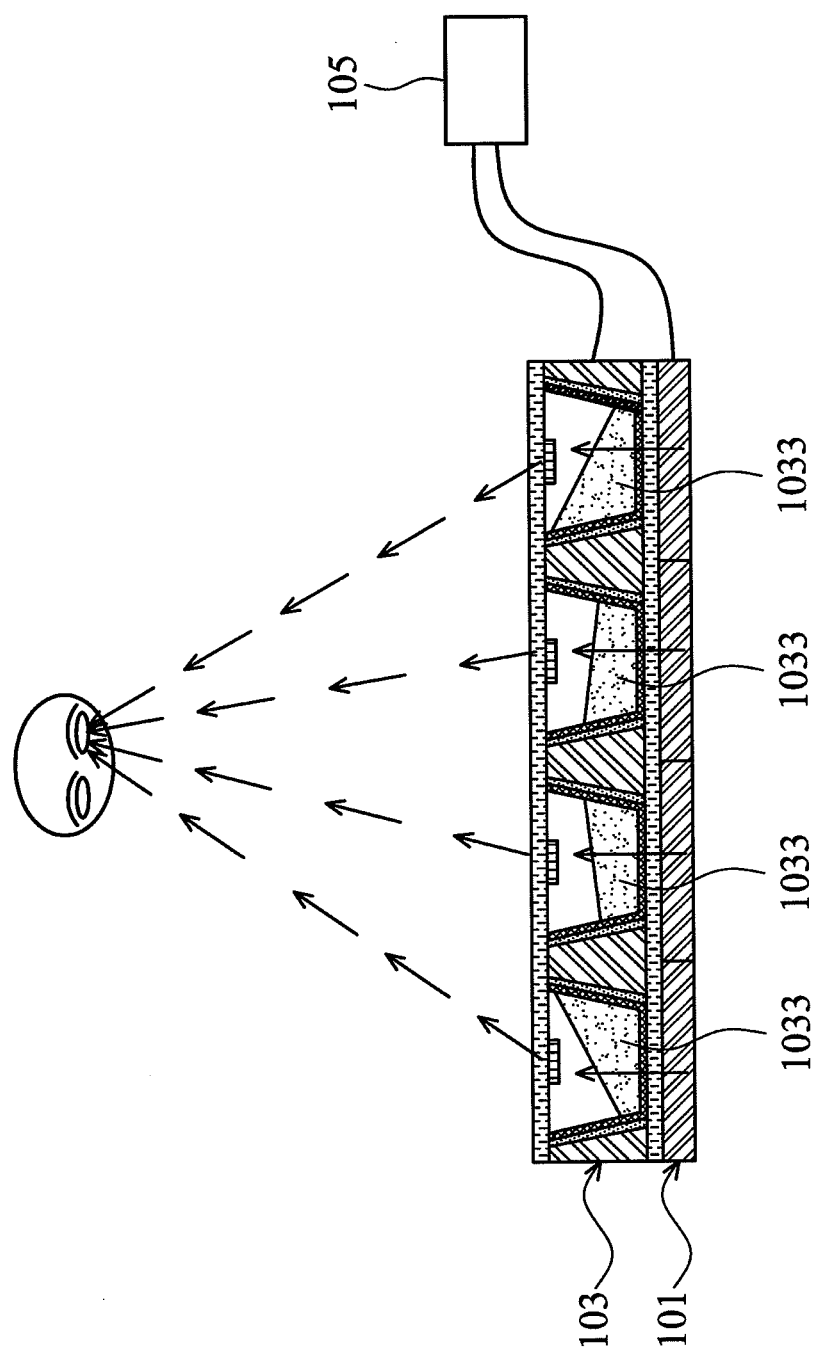

As shown in FIG. 7, the system controller 105 includes a time counting circuit 1051 and a control circuit 1053. The time counting circuit 1051 is adapted to receive a signal for synchronization from the display device 101, and the control circuit 1053 is configured to control the light modulating device 103. Referring to FIGS. 3 and 8A, the control circuit 1053 may drive the electronically switchable light modulating cells 1033 of the light modulating device 103 at time t1, thereby deflecting left eye images from the display device 101 to a left eye of a viewer. As shown in FIGS. 3 and 8B, the control circuit 1053 may drive the electronically switchable light modulating cells 1033 of the light modulating device 103 at time t2, thereby deflecting right eye images from the display device 101 to a right eye of the same viewer. Accordingly, the viewer see 3D images composed of the right eye images and the left eye images due to persistence of vision.

In another embodiment, the 3D image display system 100 may further include an optional observer tracker 107, and the system controller 105 may further include an optional tracker controller 1055 electrically connected to the time counting circuit 1051, the control circuit 1053, and the observer tracker 107, as shown in FIG. 7. The observer tracker 107 may detect a position at which a viewer is located, or eyes' position of the viewer, and then send the position data back to the tracker controller 1055. The position data is then sent to the system controller 1053 to modulate the light modulating device 103, such that the light beams of the images are deflected to the eyes of the viewer. The 3D light modulating device 100, including the observer tracker 107, is free of the visible region limitations. In one embodiment, the observer tracker 107 can be a motion sensor, a camera or a video camera.

In some embodiments, the electronically switchable light modulating cells 1033 of the light modulating device 103 can be divided into right electronically switchable light modulating cells 1033A and left electronically switchable light modulating cells 1033B. The right and left electronically switchable light modulating cells 1033A and 1033B may simultaneously deflect images from the display device 101 to the right and left eyes of the viewer, respectively. As such, the light modulating device 103 may save the time-sharing mode to obtain a higher display quality. It is noted that the pixels of the display device 101 match with the electronically switchable light modulating cells 1033, and that each of the electronically switchable light modulating cells corresponds to one or more pixels.

Figure 9A:
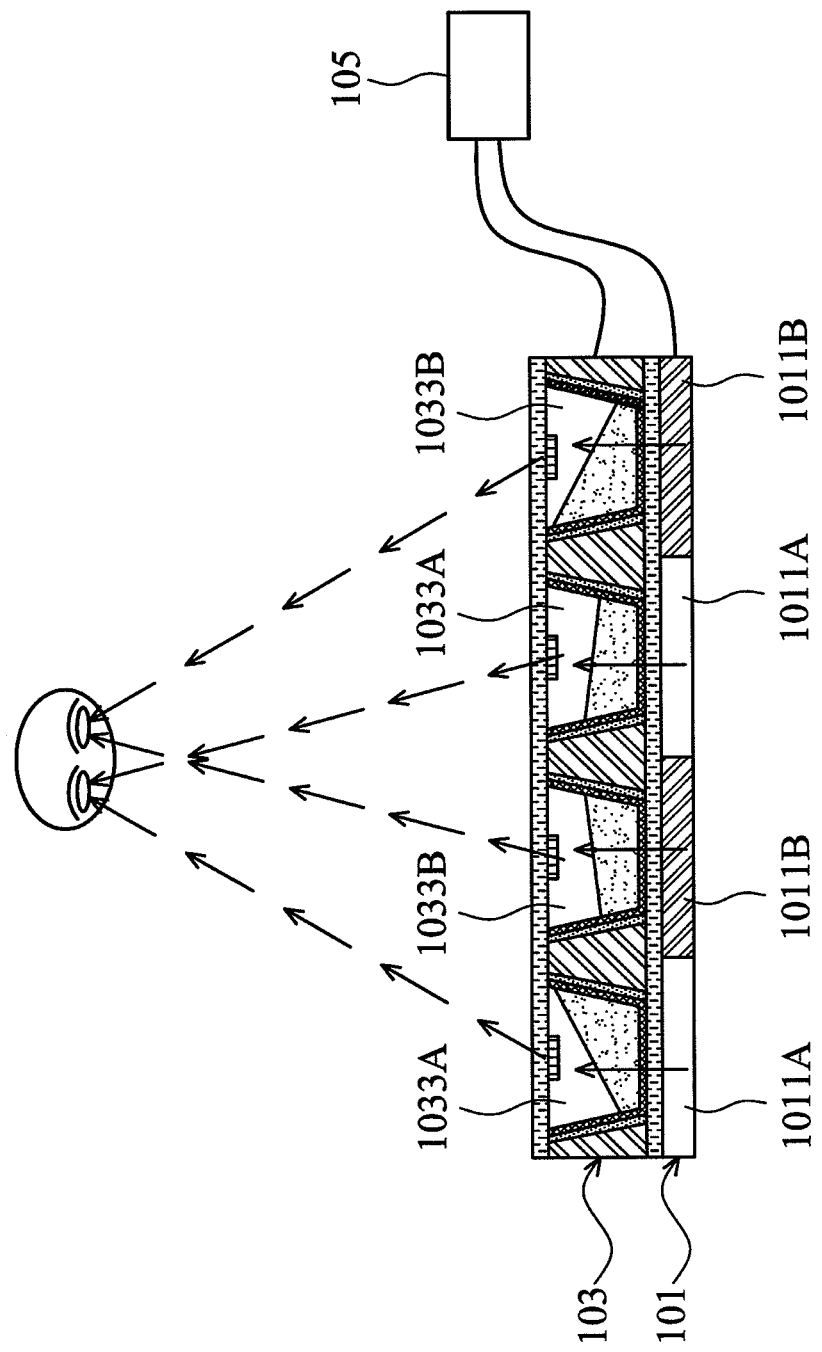
FIGS. 9A-9B and 10A-10B show display types of the 3D image display system according to various embodiments of the present invention.
Figure 9B:
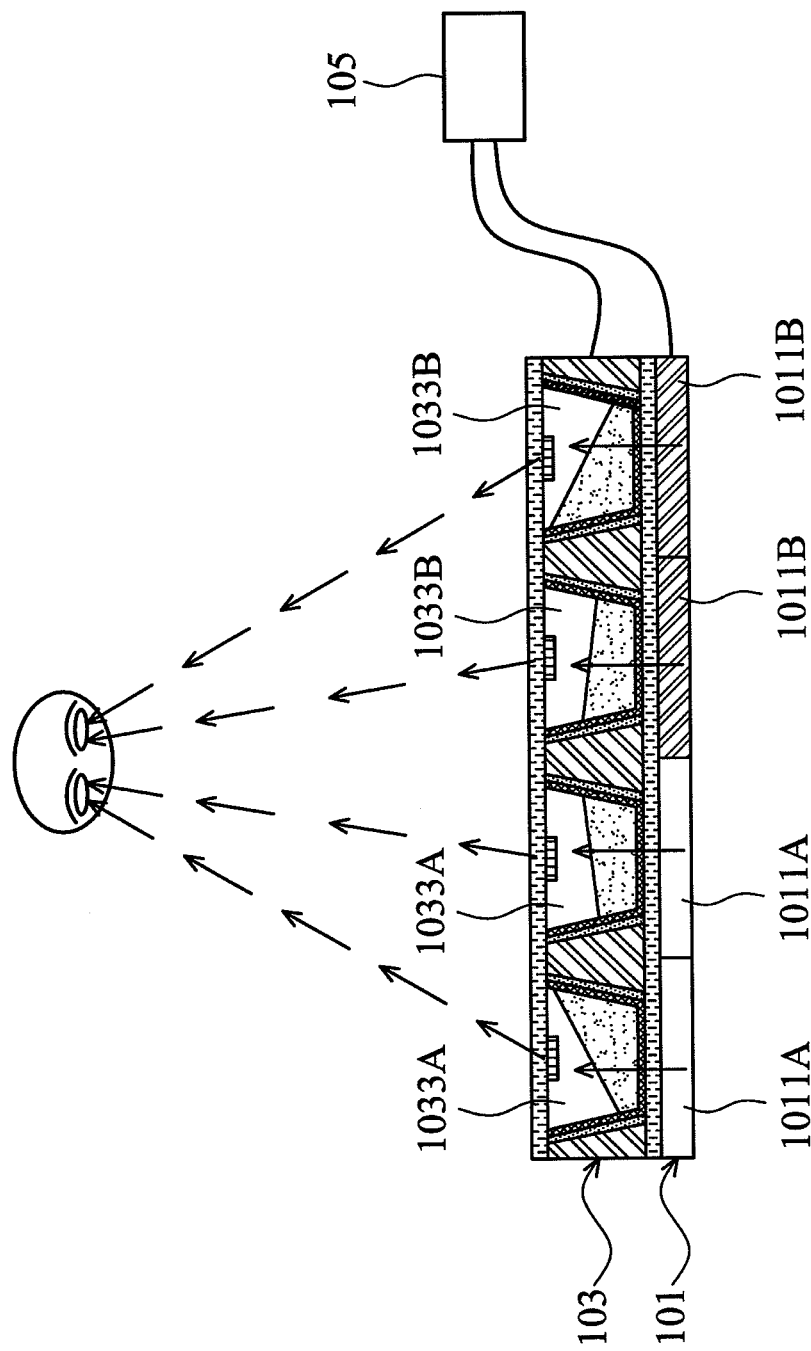

In some embodiments, the alternately arranged right/left electronically switchable light modulating cells 1033A/1033B deflect the right/left images from the display device 101 to the right/left eye of the viewer, respectively, as shown in FIG. 9A. As such, the viewer is able to see the stereoscopic images. The pixels 1011A for sending the right eye images and the pixels 1011B for sending the left eye images correspond to the right electronically switchable light modulating cell 1033A and the electronically switchable light modulating cell 1033B, respectively. The pixels 1011A and 1011B, as well as the right electronically switchable light modulating cell 1033A and the electronically switchable light modulating cell 1033B, are alternately arranged. In another embodiment, two adjacent right electronically switchable light modulating cells 1033A deflect the right eye images from the display device 101 to the right eye of the viewer, and two adjacent left electronically switchable light modulating cells 1033B deflect the left eye images from the display device 101 to the left eye of the viewer, respectively, as shown in FIG. 9B. As such, the viewer is able to see the stereoscopic images. Each of the pixels 1011A and 1011B corresponds to each of the electronically switchable light modulating cells 1033A and 1033B, respectively. Two adjacent pixels 1011A may correspond to the right electronically switchable light modulating cells 1033A and two adjacent pixels 1011B may correspond to the left electronically switchable light modulating cells 1033B.

Figure 10A:
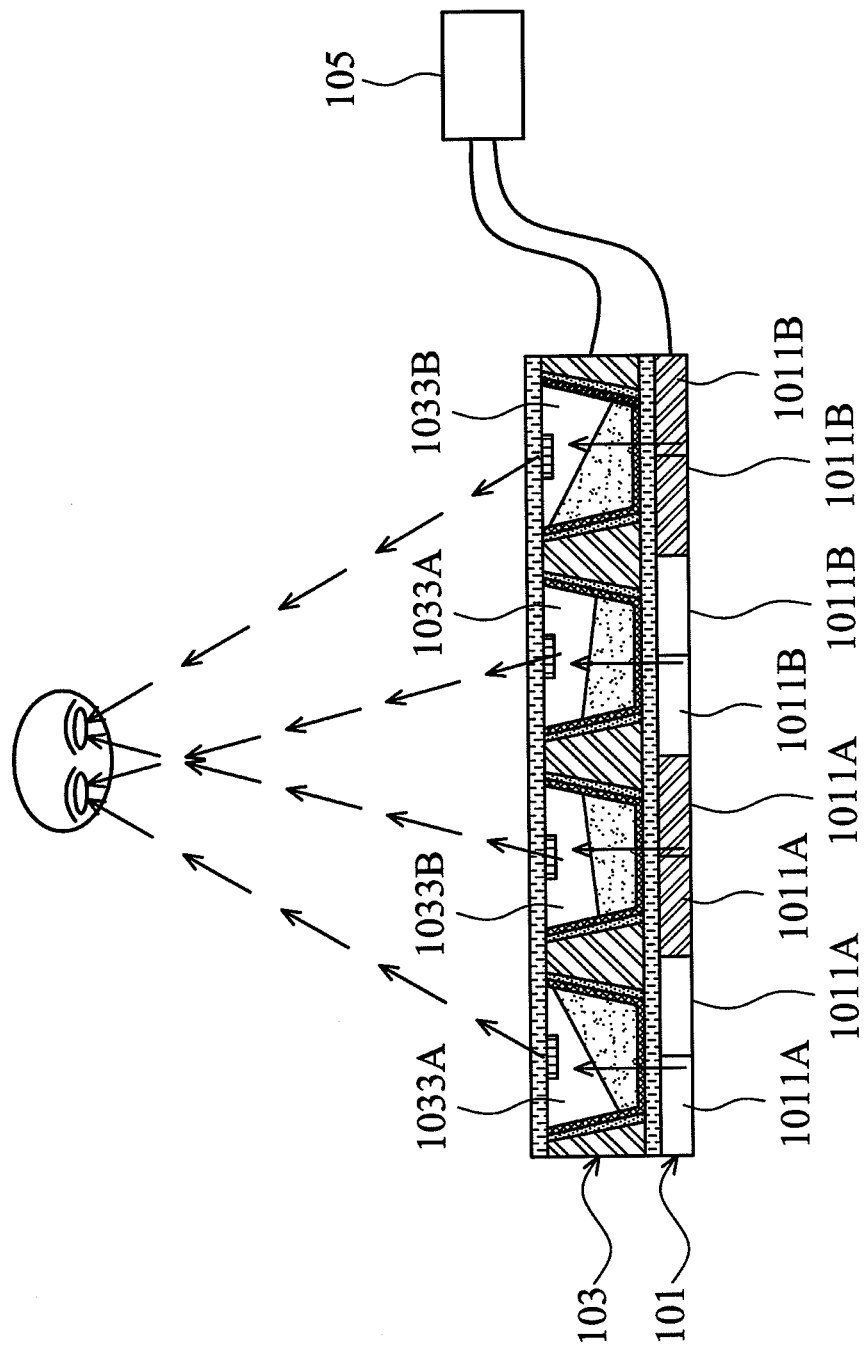
Figure 10B:
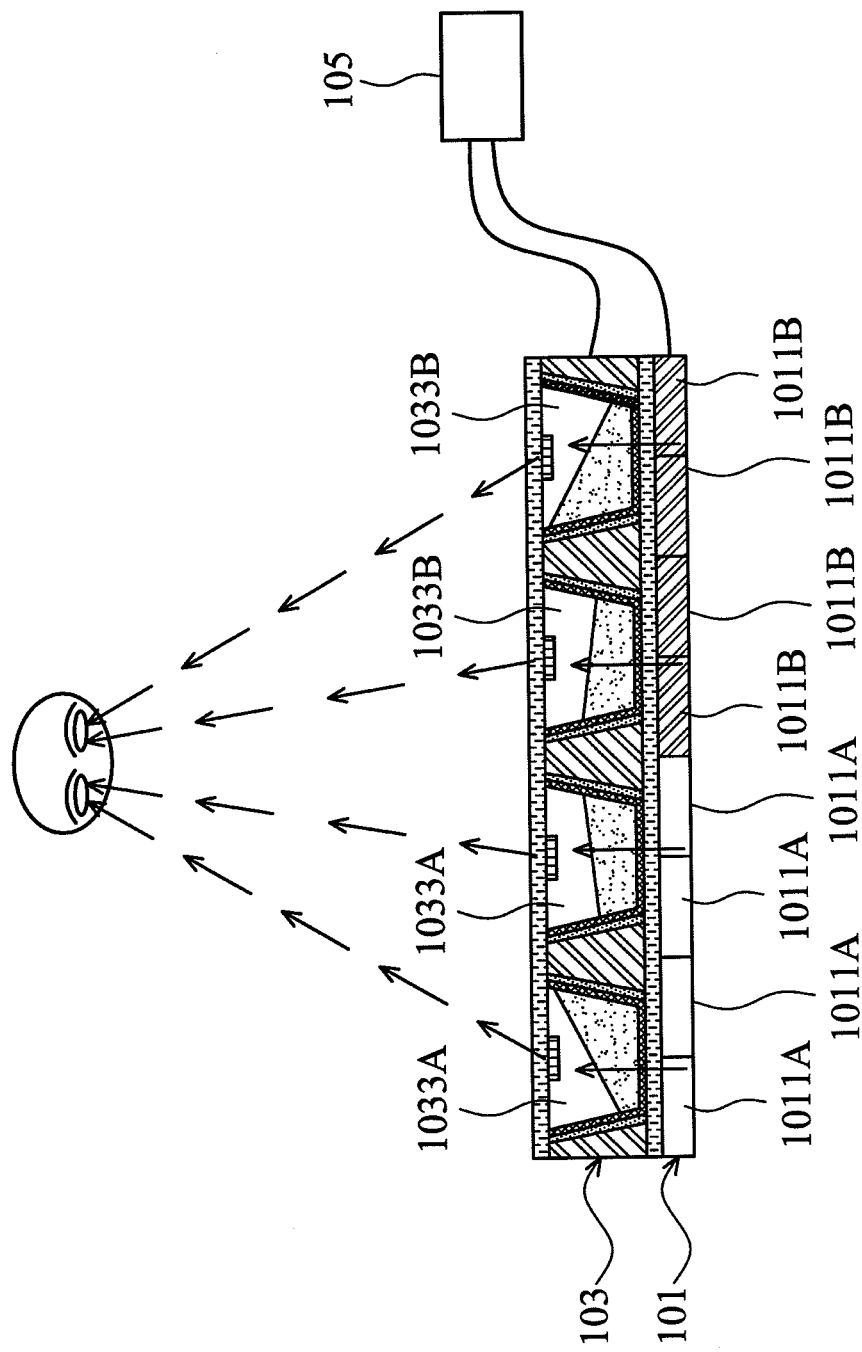

In some embodiments, each of the right electronically switchable light modulating cells 1033A may correspond to two or more pixels 1011A, and each of the left electronically switchable light modulating cells 1033B may correspond to two or more pixels 1011B, as shown in FIG. 10A. The adjacent pixels 1011A are alternately arranged to the adjacent pixels 1011B as well as the alternately arranged right electronically switchable light modulating cells 1033A and left electronically switchable light modulating cells 1033B. In another embodiment, two or more pixels 1011A and 1011B correspond to each of the right/left electronically switchable light modulating cells 1033A and 1033B, respectively, as shown in FIG. 10B. The pixels 1011A and 1011B are divided into two major adjacent groups as well as the right/left electronically switchable light modulating cells 1033A and 1033B.

The structures, arrangements, and driving methods of the electronically switchable light modulating cell 1033 are further described as below. It is noted that the definition of the terms "low-contact-angle material" and "high-contact-angle material" depend on the polarity of the light modulating medium and the materials contacting the light modulating medium. The contact angle is the angle at which a liquid/vapor interface meets a solid surface. Contact angle measurements can be used to determine the surface energy of a material. For example, the polar light modulating medium forms droplets having a high contact angle (>90°) on a hydrophobic material surface, and thus the hydrophobic material is a high-contact-angle material for the polar light modulating medium. Moreover, the non-polar light modulating medium will form droplets having a low contact angle on the hydrophobic material surface and thus hydrophobic material is a low-contact-angle material for the non-polar light modulating medium. The hydrophobic layer can be, but is not limited to, Teflon AF 1600 (commercially available from Dupont), CYTOP (commercially available from Asahi), PDMS, TEOS, epoxy, or the like. The hydrophilic layer can be, but is not limited to, acrylic acid, siloxane-containing material, and the like. The hydrophobic layer and the hydrophilic layer preferably have transparency, flexibility, and surface stability.

Figures 11A, 11B, 11C:
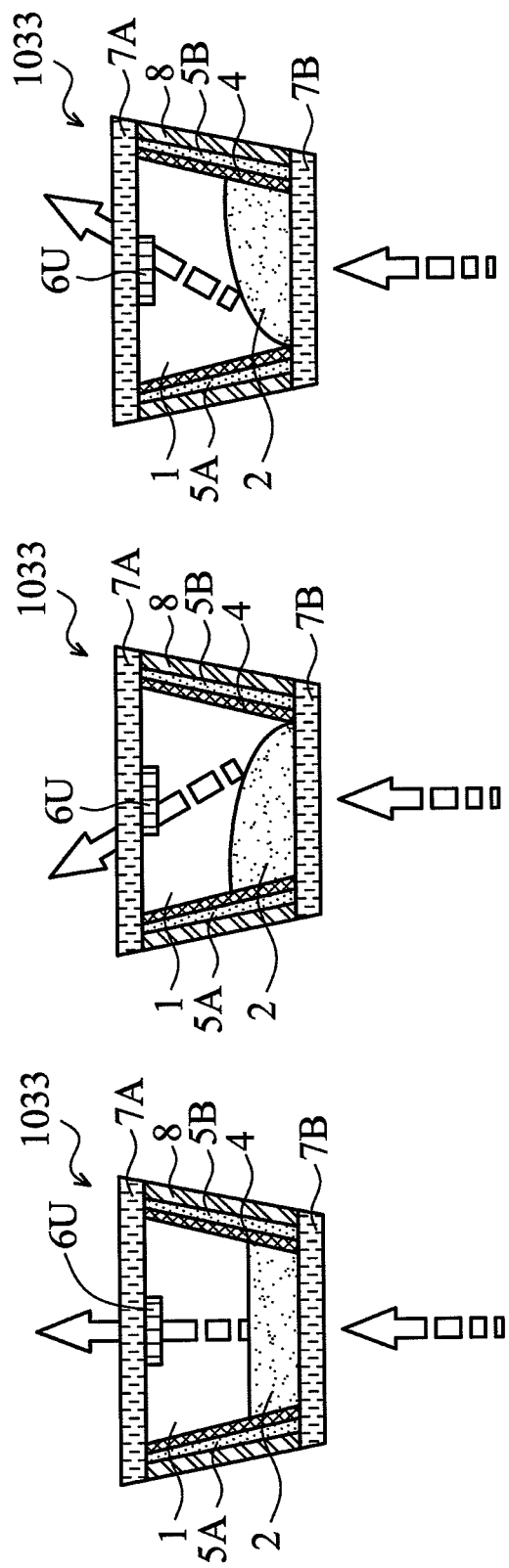
FIGS. 11A-11C, 12, 13A-13C, 14, and 15-51 show cross-sections of electronically switchable light modulating cells of the 3D image display systems according to various embodiments of the present invention.
Figure 11D:
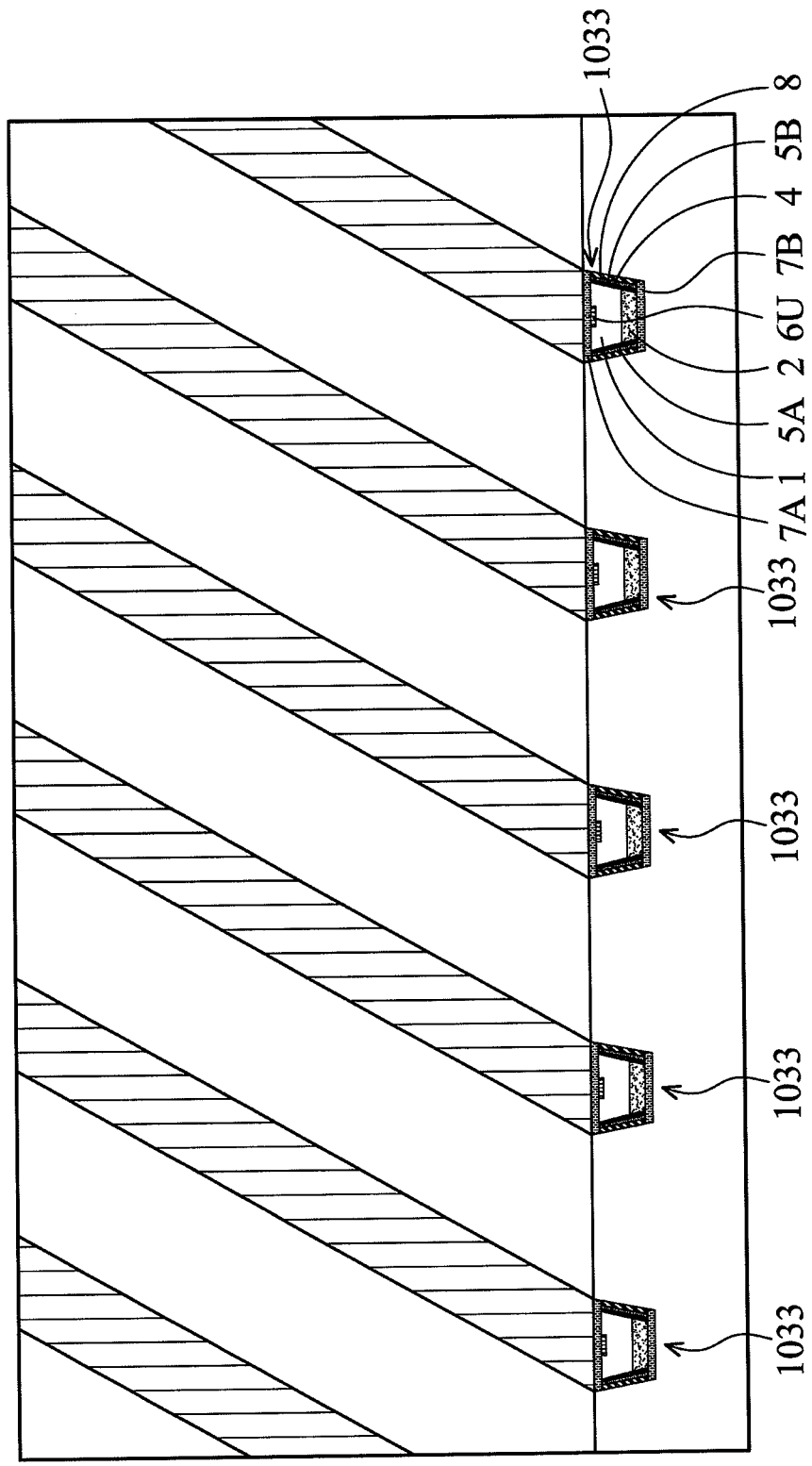
FIG. 11D shows a perspective view of the electronically switchable light modulating cell of the 3D image display system of FIGS. 11A-11C.

As shown in FIG. 11A, the electronically switchable light modulating cell 1033 includes a substrate 7B, spacers 8 on the substrate 7B, and an opposite substrate 7A on the spacers 8 to define a compartment. A top electrode 6U is on the opposite substrate 7A surface. A left electrode 5A and a right electrode 5B are on the left and right spacers 8, respectively. A dielectric layers 4 is formed on the left electrode 5A and the right electrode 5B, respectively. Two high-contact-angle material layers (e.g., hydrophobic layers) 3A are formed on the two dielectric layers 4, respectively. A polar light modulating medium 1 and a non-polar light modulating medium 2 are filled into the compartment, and the light modulating mediums are incompatible. Optionally, the refractive index of at least one of the polar light modulating medium 1 and the non-polar light modulating medium 2 is matching with the refractive index of the spacers 8, so as to minimize the light scattering effect occurs at the interface between the spacers 8 and the polar light modulating medium 1 or between the spacers 8 and the non-polar light modulating medium 2. As shown in 11A, the cross-section of the electronically switchable light modulating cell 1033 is a reversed isosceles trapezoid, and the spacers 8 is inclined to the substrate 7B and the opposite substrate 7A. In this embodiment, the single electronically switchable light modulating cell 1033 can be driven by the time-sharing mode in FIG. 3 to deflect the left eye images to the left eye during the period t1, and deflect the right eye images to the right eye during the period t2, as shown in FIGS. 11B and 11C. In some embodiment, the electronically switchable light modulating cells in FIG. 11A may concave into a substrate as an array of trenches, as shown in FIG. 11D. A top view of the electronically switchable light modulating cells in FIG. 11D is shown in FIG. 11E.

Figure 11E:
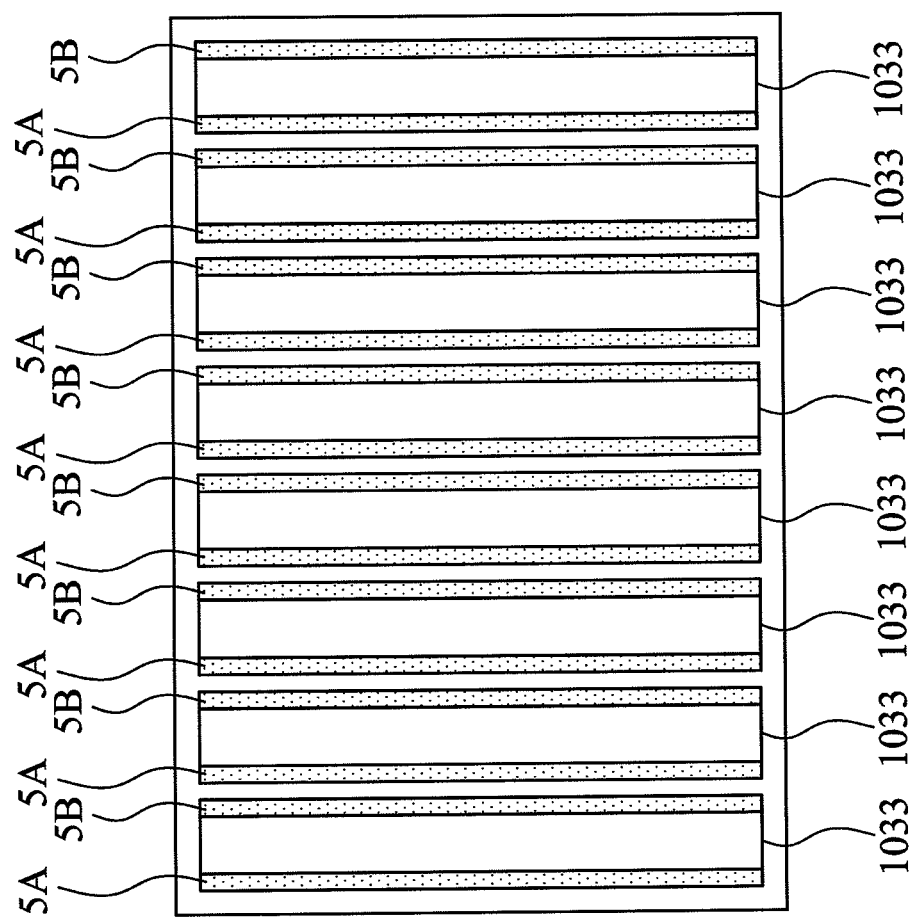
FIG. 11E shows a top view of the electronically switchable light modulating cell of the 3D image display system of FIGS. 11A-11C.

FIG. 11E shows a top view of the electronically switchable light modulating cell of the 3D image display system in FIG. 11A-11C.

Figure 12:
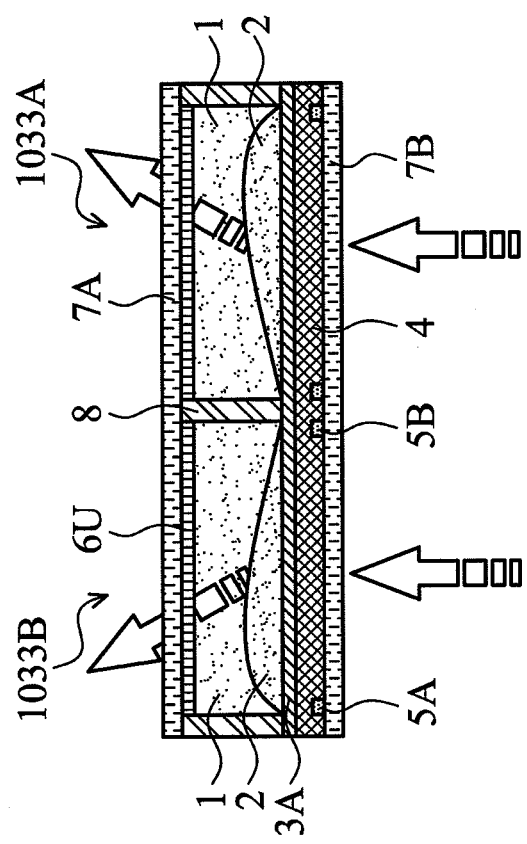

As shown in FIG. 12, two adjacent electronically switchable light modulating cell s 1033A and 1033B include a substrate 7B, spacers 8 on the substrate 7B, and an opposite substrate 7A on the spacers 8 to define two adjacent compartments. Two top electrodes 6U are disposed on the opposite substrate 7A surface of the two compartments, respectively. Two left electrodes 5A and two right electrodes 5B are on the substrate 7B of the two compartments, respectively. In addition, two left electrodes 5A and two right electrodes 5B may be formed on the same level or different levels of the substrate 7B. A dielectric layer 4 is formed on the substrate 7B to cover the left electrodes 5A and the right electrodes 5B, and a high-contact-angle material layer (e.g., a hydrophobic layer) 3A is formed on the dielectric layer 4. As shown in FIG. 12, the spacers 8 are formed on the hydrophobic layer 3A. A polar light modulating medium 1 and a non-polar light modulating medium 2 are filled into the two compartments, respectively, and the light modulating mediums are incompatible. In this embodiment of the present invention, the two electronically switchable light modulating cells 1033A and 1033B may deflect the left eye images and the right eye images to the left eye and the right eye of the viewer during the same time period, respectively, without using the time-sharing mode as shown in FIG. 3.

Figure 13:
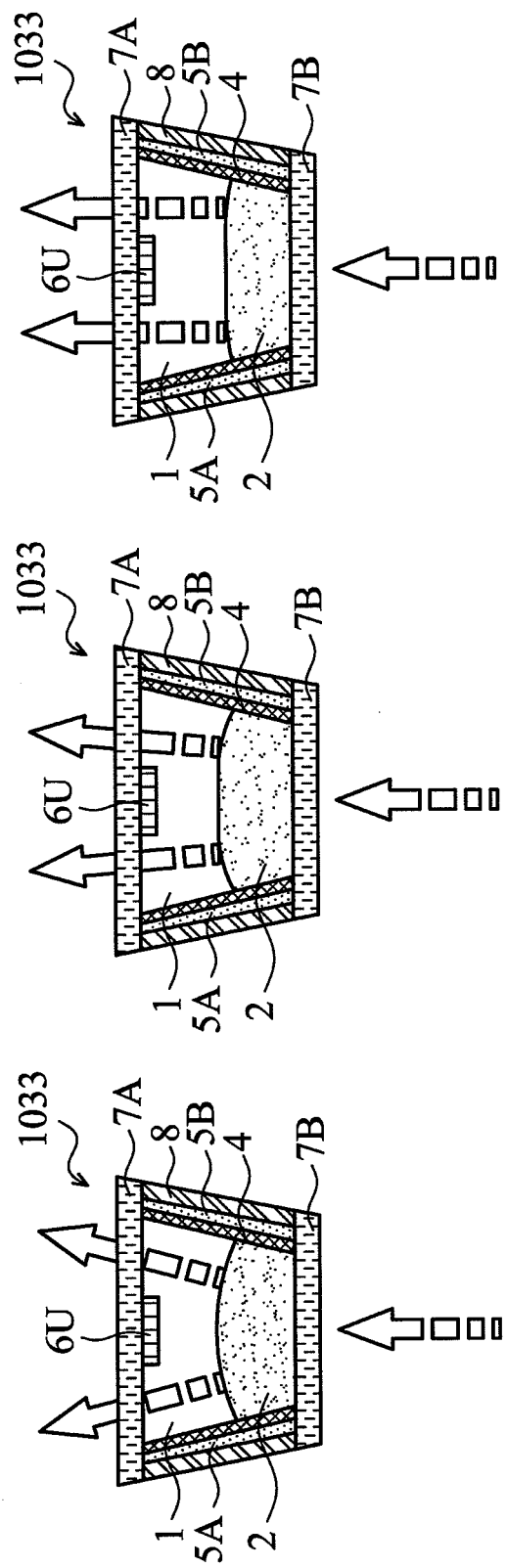

FIGS. 13A-13C show an electronically switchable light modulating cell 1033 similar to that shown in FIGS. 11A-11C. In FIGS. 13A-13C, the electrodes 5A and 5B of the electronically switchable light modulating cell 1033 are applied with the same voltage. The voltage difference between the top electrode 6U and the electrodes 5A/5B changes the curvature ratio of the interface between the polar light modulating medium 1 and the non-polar light modulating medium 2, thereby tuning the focal length of the images from the display device (not shown).

Figure 14:
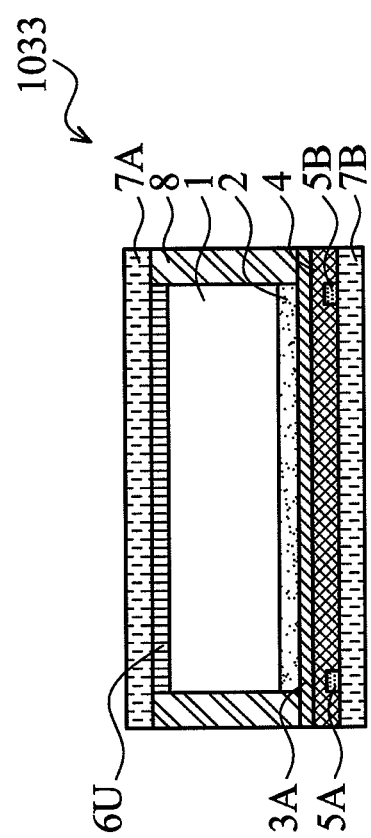

FIG. 14 shows an electronically switchable light modulating cell 1033 similar to one of the two electronically switchable light modulating cells 1033A and 1033B of FIG. 12. In this embodiment, the single electronically switchable light modulating cell 1033 can be driven by the time-sharing mode in FIG. 3 to deflect the left eye images to the left eye at time t1, and deflect the right eye images to the right eye at time t2.

Figure 15:
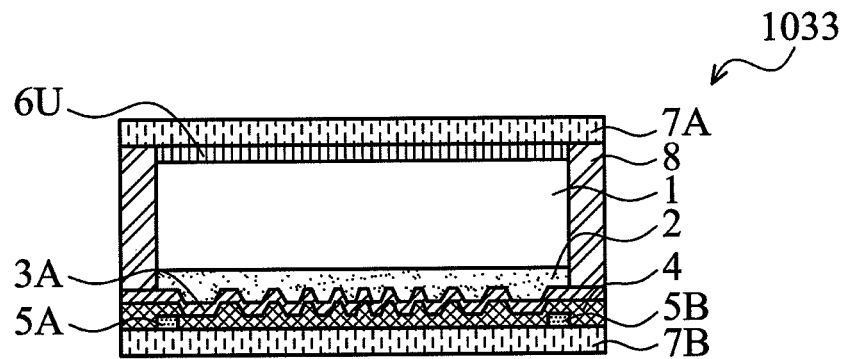

As shown in FIG. 15, an electronically switchable light modulating cell 1033 includes a substrate 7B, spacers 8 over the substrate 7B, and an opposite substrate 7A on the spacers 8 to define a compartment. A top electrode 6U is on the opposite substrate 7A surface. A left electrode 5A and a right electrode 5B are disposed on the substrate 7B, and the electrodes 5A and 5B may be formed on the same level or different levels of the substrate 7B. A zigzag-shaped dielectric layer 4 is formed on the substrate 7B to cover the left electrode 5A and the right electrode 5B, and a zigzag-shaped high-contact-angle material layer (e.g., a hydrophobic layer) 3A is conformally formed on the dielectric layer 4. A polar light modulating medium 1 and a non-polar light modulating medium 2 are filled into the compartment, and the light modulating mediums are incompatible. As shown in FIG. 15, the spacers 8 are formed on the zigzag-shaped hydrophobic layer 3A. The zigzag-shaped hydrophobic layer 3A has low surface energy, and the zigzag structure thereof is scaled from 10 nm to 1000 nm. Alternatively, the zigzag-shaped hydrophobic layer can be collocated with a planar dielectric layer 4.

Figure 16:
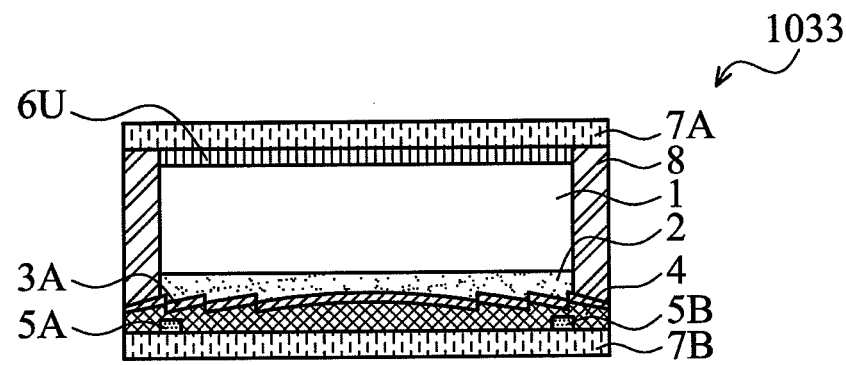

As shown in FIG. 16, an electronically switchable light modulating cell 1033 includes a substrate 7B, spacers 8 over the substrate 7B, and an opposite substrate 7A on the spacers 8 to define a compartment. A top electrode 6U is on the opposite substrate 7A surface. A left electrode 5A and a right electrode 5B are on the substrate 7B. In addition, the left electrode 5A and the right electrode 5B may be formed on the same level or different levels of the substrate 7B. A Fresnel lens-shaped dielectric layer 4 is formed on the substrate 7B to cover the left electrode 5A and the right electrode 5B, and a Fresnel lens-shaped high-contact-angle material layer (e.g., a hydrophobic layer) 3A is conformally formed on the dielectric layer 4. A polar light modulating medium 1 and a non-polar light modulating medium 2 are filled into the compartment, and the light modulating mediums are incompatible. As shown in FIG. 16, the spacers 8 are formed on the Fresnel lens-shaped hydrophobic layer 3A. When the voltages applied to the top electrode 6U and the electrodes 5A/5B are similar, the non-polar light modulating medium 2 has a planar surface without any focus effect. When the voltages applied to the top electrode 6U and the electrodes 5A/5B are different, the non-polar light modulating medium 2 in the center part of the compartment is repelled to the peripheral part of the compartment, such that the Fresnel lens is exposed with a focus effect.

Figure 17:
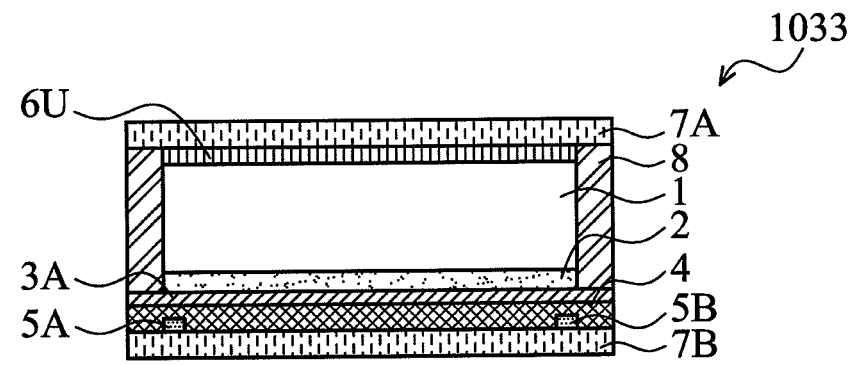

As shown in FIG. 17, an electronically switchable light modulating cell 1033 includes a substrate 7B, spacers 8 over the substrate 7B, and an opposite substrate 7A on the spacers 8 to define a compartment. A top electrode 6U is on the opposite substrate 7A surface. A left electrode 5A and a right electrode 5B are on the substrate 7B. In addition, the left electrode 5A and the right electrode 5B may be formed on the same level or different levels of the substrate 7B. A dielectric layer 4 is formed on the substrate 7B to cover the left electrode 5A and the right electrode 5B, and a gradient high-contact-angle material layer (e.g., a hydrophobic layer) 3A is formed on the dielectric layer 4. A polar light modulating medium 1 and a non-polar light modulating medium 2 are filled into the compartment, and the light modulating mediums are incompatible. As shown in FIG. 17, the spacers 8 are formed on the gradient hydrophobic layer 3A. In one embodiment, the hydrophobic layer 3A is formed in a gradient manner which continuously increases or decreases in hydrophobicity from the center of the hydrophobic layer 3A to the peripheral of the hydrophobic layer 3A.

Figure 18:
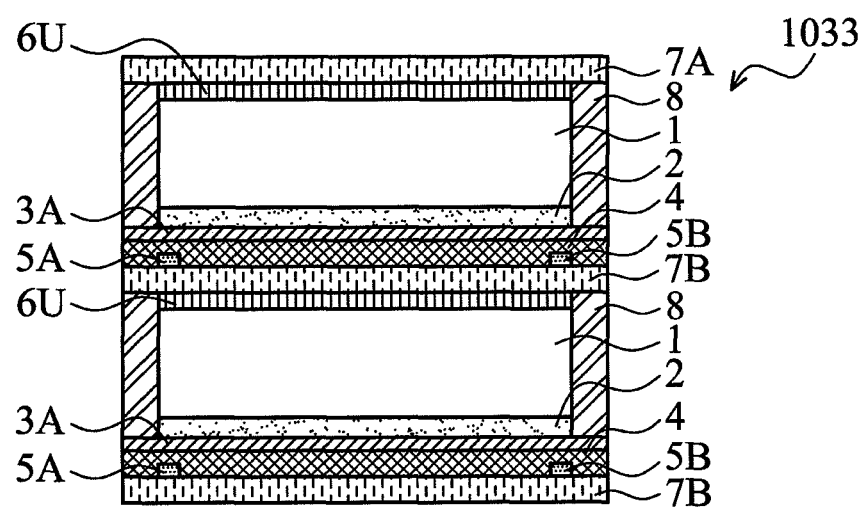

As shown in FIG. 18, two electronically switchable light modulating cells 1033 similar to the electronically switchable light modulating cell 1033 of FIG. 14 are stacked so as to increase the deflection effect. It is noted that the opposite substrate 7A of the lower electronically switchable light modulating cell 1033 and the substrate 7B of the upper electronically switchable light modulating cell 1033 can be a single substrate.

Figure 19:
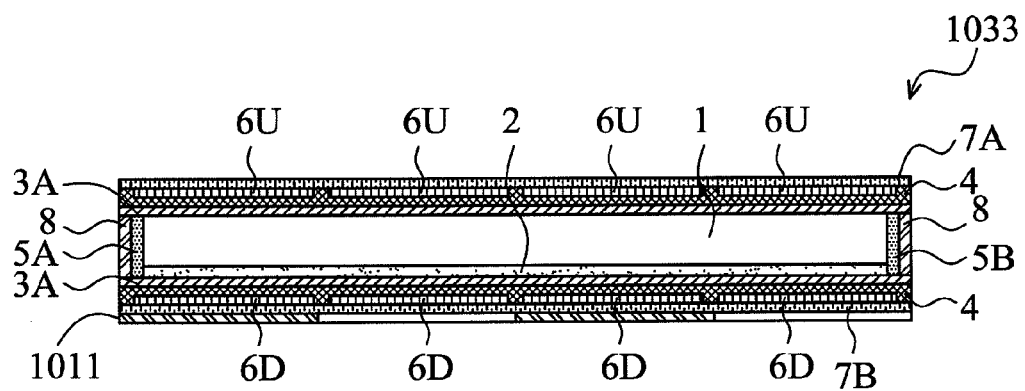

As shown in FIG. 19, an electronically switchable light modulating cell 1033 includes a substrate 7B, spacers 8 over the substrate 7B, and an opposite substrate 7A over the spacers 8 to define a compartment. A top electrode 6U is on the opposite substrate 7A surface. Left electrodes 5A and right electrodes 5B are over the substrate 7B. A dielectric layer 4 is formed on the substrate 7B to cover the left electrodes 5A and the right electrodes 5B, and a high-contact-angle material layer (e.g., a hydrophobic layer) 3A is formed on the dielectric layer 4. A polar light modulating medium 1 and a non-polar light modulating medium 2 are filled into the compartment, and the light modulating mediums are incompatible. As shown in FIG. 19, the spacers 8 are formed on the hydrophobic layer 3A. In addition, several color filters of one pixel 1011 are formed under the substrate 7B. In other words, one pixel 1011 corresponds to one electronically switchable light modulating cell 1033. The shapes of the light modulating mediums 1 and 2 and the interface therebetween can be tuned by applying different voltages to the top electrode 6U, the left electrodes 5A, and right electrodes 5B.

Figure 20:
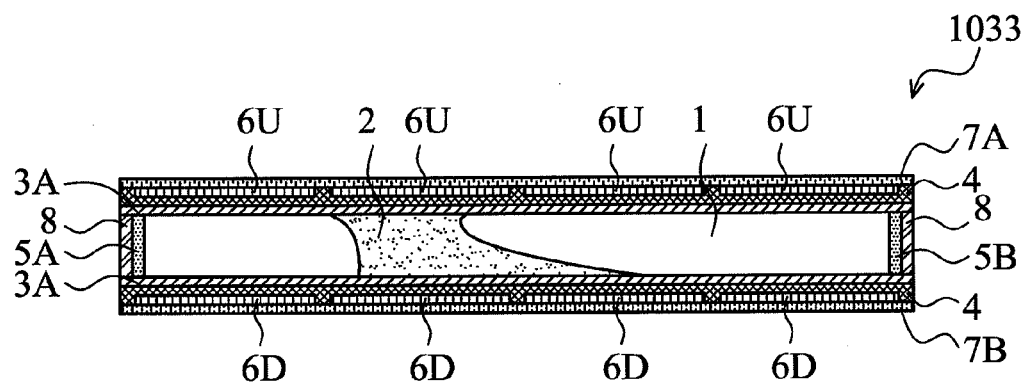

As shown in FIG. 20, the electronically switchable light modulating cell 1033 includes a substrate 7B, spacers 8 over the substrate 7B, and an opposite substrate 7A over the spacers 8 to define a compartment. A left electrode 5A and a right electrode 5B are on the left and right spacers 8, respectively. Top electrodes 6U and bottom electrodes 6D are on the opposite substrate 7A surface and the substrate 7B surface, respectively. Two dielectric layers 4 are formed on the substrate 7A and the substrate 7B, respectively. Two high-contact-angle material layers (e.g., hydrophobic layers) 3A are formed on the two dielectric layers 4, respectively. A polar light modulating medium 1 and a non-polar light modulating medium 2 are filled into the compartment, and the light modulating mediums are incompatible. As shown in FIG. 20, the cross-section of the electronically switchable light modulating cell 1033 is rectangular-shaped, and the spacers 8 are perpendicular to the substrate 7B and the opposite substrate 7A. In addition, the spacers 8 are formed on the hydrophobic layer 3A on the substrate 7B, and the hydrophobic layer 3A on the opposite substrate 7A is formed on the spacers 8. Because the distance between the substrate 7B and the opposite substrate 7A is short and/or the ratio of the non-polar light modulating medium 2 to polar light modulating medium 1 is high, the non-polar light modulating medium 2 may simultaneously contact the substrate 7B and the opposite substrate 7A. The shape of the non-polar light modulating medium 2 can be tuned by applying different voltages to the top electrodes 6U, the bottom electrodes 6D, the left electrode 5A, and the right electrode 5B.

Figure 21:
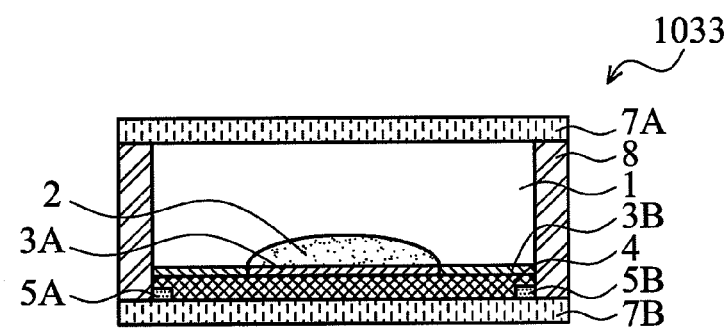

As shown in FIG. 21, an electronically switchable light modulating cell 1033 includes a substrate 7B, spacers 8 on the substrate 7B, and an opposite substrate 7A on the spacers 8 to define a compartment. A left electrode 5A and a right electrode 5B are on the substrate 7B. In addition, the left electrode 5A and the right electrode 5B may be disposed on the same level or different levels of the substrate 7B. A dielectric layer 4 is formed on the substrate 7B to cover the left electrode 5A and the right electrode 5B, and a high-contact-angle material layer (e.g., a hydrophobic layer) 3A and a low-contact-angle material layer (e.g., a hydrophilic layer) 3B are formed on the dielectric layer 4. The hydrophobic layer 3A is surrounded by the hydrophilic layer 3B. A polar light modulating medium 1 and a non-polar light modulating medium 2 are filled into the compartment, and the light modulating mediums are incompatible. In a further embodiment, the hydrophobic layer 3A is composed of at least two different hydrophobic materials, and the hydrophilic layer 3B is composed of at least two different hydrophilic materials. When a profile of the non-polar light modulating medium 2 in the electronically switchable light modulating cell 1033 is changed by a time-sharing mode as shown in FIG. 3, the above design may limit the non-polar light modulating medium 2 to a central region other than a peripheral region of the electronically switchable light modulating cell 1033. As such, the position of the non-polar light modulating medium 2 position is stabilized on the hydrophobic layer 3A surrounded by the hydrophilic layer 3B.

Figure 22:
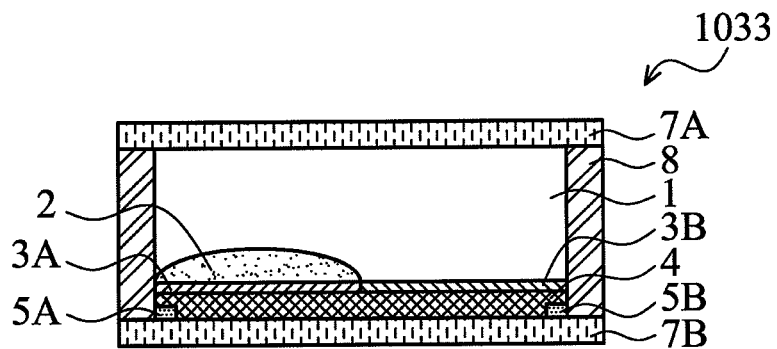

As shown in FIG. 22, an electronically switchable light modulating cell 1033 includes a substrate 7B, spacers 8 on the substrate 7B, and an opposite substrate 7A on the spacers 8 to define a compartment. A left electrode 5A and a right electrode 5B are on the substrate 7B. In addition, the left electrode 5A and the right electrode 5B may be formed on the same level or different levels of the substrate 7B. A dielectric layer 4 is formed on the substrate 7B to cover the left electrode 5A and the right electrode 5B, and a high-contact-angle material layer (e.g., a hydrophobic layer) 3A and a low-contact-angle material layer (e.g., a hydrophilic layer) 3B are formed on the dielectric layer 4. A polar light modulating medium 1 and a non-polar light modulating medium 2 are filled into the compartment, and the light modulating mediums are incompatible. The hydrophobic layer 3A is formed adjacent to the hydrophilic layer 3B. As shown in FIG. 22, the hydrophobic layer 3A and the hydrophilic layer 3B have similar areas with a symmetrical pattern.

Figure 23:
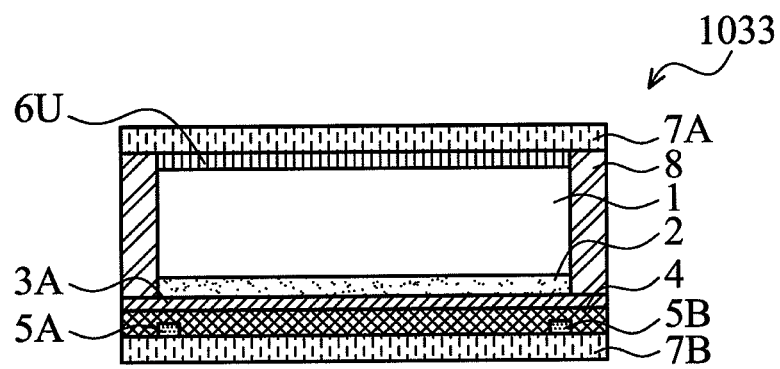

As shown in FIG. 23, an electronically switchable light modulating cell 1033 includes a substrate 7B, spacers 8 over the substrate 7B and on a high-contact-angle material layer (e.g., a hydrophobic layer) 3A, and an opposite substrate 7A on the spacers 8 to define a compartment. A left electrode 5A and a right electrode 5B are on the substrate 7B. A top electrodes 6U is on the opposite substrate 7A surface. A dielectric layer 4 is formed on the substrate 7B to cover the left electrodes 5A and the right electrodes 5B, and the hydrophobic layer 3A is formed on the dielectric layer 4. A polar light modulating medium 1 and a non-polar light modulating medium 2 are filled into the compartment, and the light modulating mediums are incompatible. As shown in FIG. 23, the spacers 8 are formed on the hydrophobic layer 3A. The shapes of the light modulating mediums 1 and 2 and the interface therebetween can be tuned by applying different voltages to the top electrode 6U, the left electrodes 5A, and right electrodes 5B.

Figure 24:
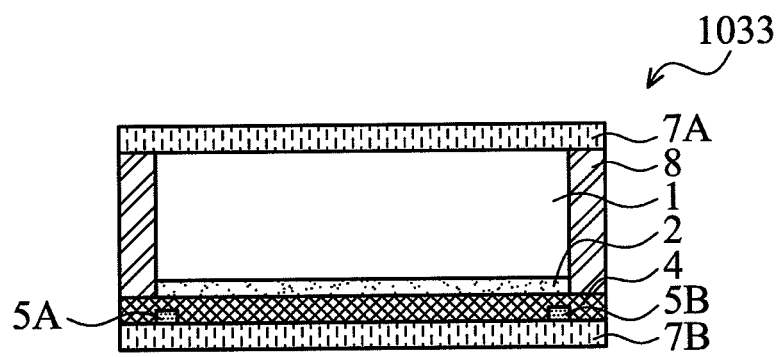

As shown in FIG. 24, an electronically switchable light modulating cell 1033 includes a substrate 7B, spacers 8 over the substrate 7B, and an opposite substrate 7A on the spacers 8 to define a compartment. A left electrode 5A and a right electrode 5B are on the substrate 7B. In addition, the left electrode 5A and the right electrode 5B may be disposed on the same level or different levels of the substrate 7B. A dielectric layer 4 is formed on the substrate 7B to cover the left electrodes 5A and the right electrodes 5B. A polar light modulating medium 1 and a non-polar light modulating medium 2 are filled into the compartment, and the light modulating mediums are incompatible. As shown in FIG. 24, the spacers 8 are formed on the dielectric layer 4.

Figure 25:
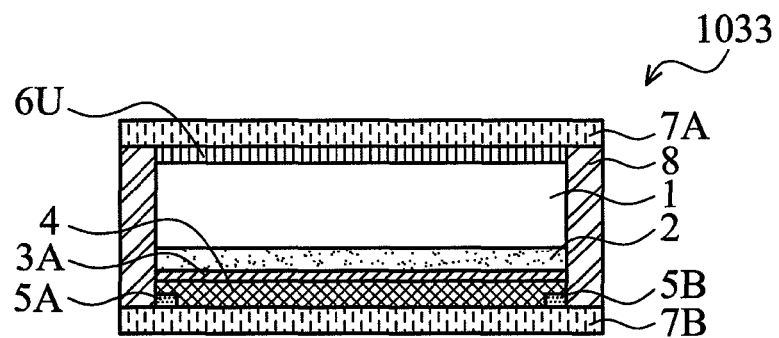

As shown in FIG. 25, an electronically switchable light modulating cell 1033 includes a substrate 7B, spacers 8 on the substrate 7B, and an opposite substrate 7A on the spacers 8 to define a compartment. A top electrode 6U is on the opposite substrate 7A. A left electrode 5A and a right electrode 5B are on the substrate 7B. In addition, the left electrode 5A and the right electrode 5B may be formed on the same level or different levels of the substrate 7B. A dielectric layer 4 is formed on the substrate 7B to cover the left electrodes 5A and the right electrodes 5B, and a high-contact-angle material layer (e.g., a hydrophobic layer) 3A is formed on the dielectric layer 4. A polar light modulating medium 1 and a non-polar light modulating medium 2 are filled into the compartment, and the light modulating mediums are incompatible.

Figure 26:
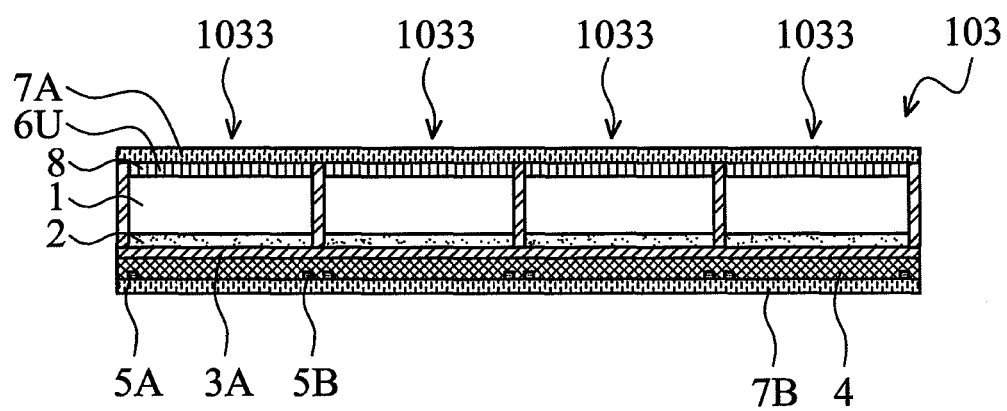

As shown in FIG. 26, the electronically switchable light modulating cells 1033 in FIG. 14 can be arranged in an array to form a light modulating display device 103.

Figure 27:
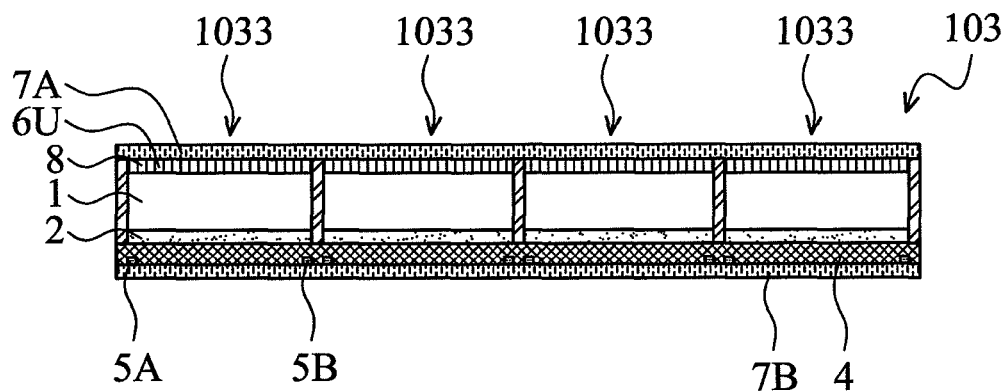

As shown in FIG. 27, the electronically switchable light modulating cells 1033 in FIG. 23 can be arranged in an array to form a light modulating display device 103.

Figure 28:
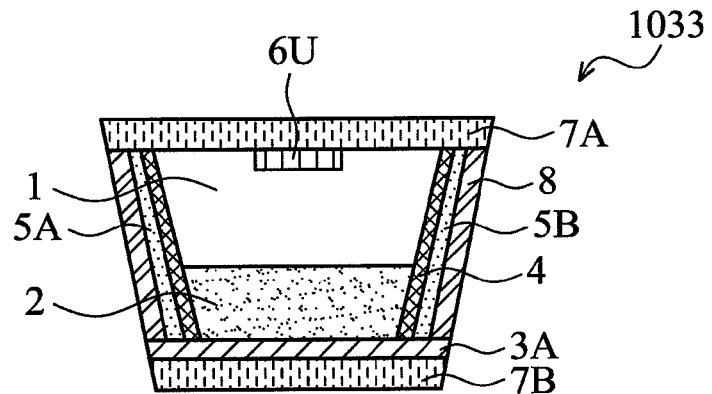

As shown in FIG. 28, the electronically switchable light modulating cell 1033 includes a substrate 7B, spacers 8 over the substrate 7B, and an opposite substrate 7A on the spacers 8 to define a compartment. A top electrode 6U is on the opposite substrate 7A surface. A left electrode 5A and a right electrode 5B are on the left and right spacers 8, respectively. Two dielectric layers 4 are formed on the right and left electrodes 5B and 5A, respectively. A high-contact-angle material layer (e.g., a hydrophobic layer) 3A is formed on the substrate 7B. A polar light modulating medium 1 and a non-polar light modulating medium 2 are filled into the compartment, and the light modulating mediums are incompatible. As shown in 28, the cross-section of the electronically switchable light modulating cell 1033 is a reversed isosceles trapezoid, and the spacers 8 is inclined to the substrate 7B and the opposite substrate 7A. Moreover, the spacers 8 are formed on the hydrophobic layer 3A.

Figure 29:
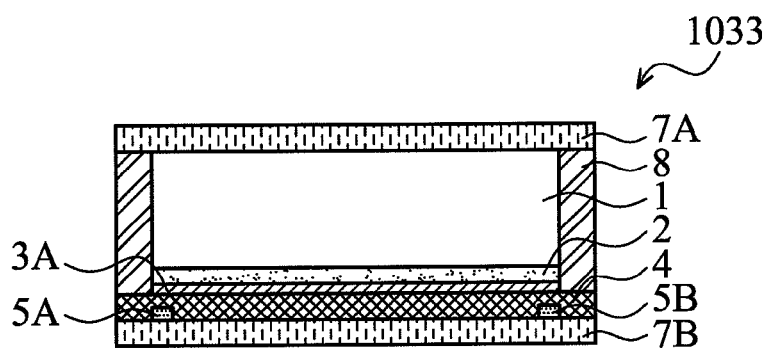

As shown in FIG. 29, an electronically switchable light modulating cell 1033 includes a substrate 7B, spacers 8 over the substrate 7B, and an opposite substrate 7A on the spacers 8 to define a compartment. A left electrode 5A and a right electrode 5B are on the substrate 7B. In addition, the left electrode 5A and the right electrode 5B may be disposed on the same level or different levels of the substrate 7B. A dielectric layer 4 is formed on the substrate 7B to cover the left electrodes 5A and the right electrodes 5B, and a high-contact-angle material layer (e.g., a hydrophobic layer) 3A is formed on the dielectric layer 4. A polar light modulating medium 1 and a non-polar light modulating medium 2 are filled into the compartment, and the light modulating mediums are incompatible. As shown in FIG. 29, the spacers 8 are formed on the dielectric layer 4.

Figure 30:
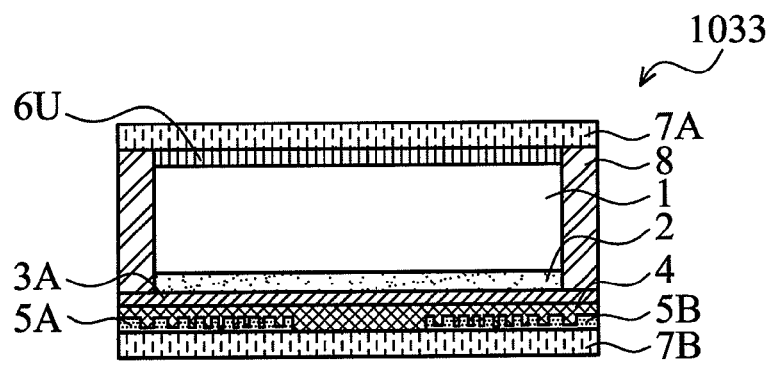

As shown in FIG. 30, an electronically switchable light modulating cell 1033 includes a substrate 7B, spacers 8 over the substrate 7B, and an opposite substrate 7A on the spacers 8 to define a compartment. A top electrode 6U is on the opposite substrate 7A surface. A zigzag-shaped left electrode 5A and a zigzag-shaped right electrode 5B are on the substrate 7B. A dielectric layer 4 is formed on the substrate 7B to cover the left electrode 5A and the right electrode 5B, and a high-contact-angle material layer (e.g., a hydrophobic layer)

3A is formed on the dielectric layer 4. A polar light modulating medium 1 and a non-polar light modulating medium 2 are filled into the compartment, and the light modulating mediums are incompatible. As shown in FIG. 30, the spacers 8 are formed on the hydrophobic layer 3A.

Figure 31:
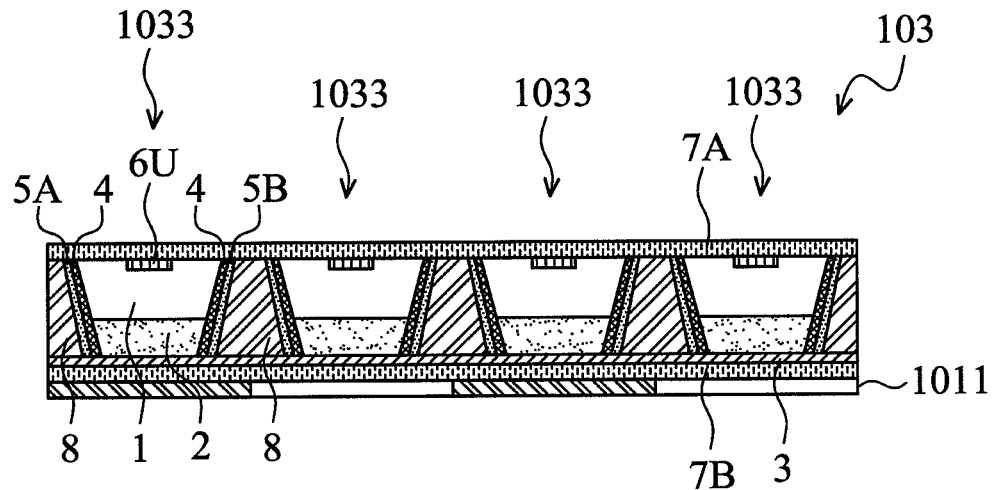

As shown in FIG. 31, the electronically switchable light modulating cells 1033 of FIG. 28 may be arranged in an array to form a light modulating device 103. In addition, several color filters of one pixel 1011 are formed under the substrate 7B, and each of the color filters of the pixel 1011 corresponds to one of the electronically switchable light modulating cells 1033, respectively. In other words, one pixel corresponds to several electronically switchable light modulating cells 1033.

Figure 32:
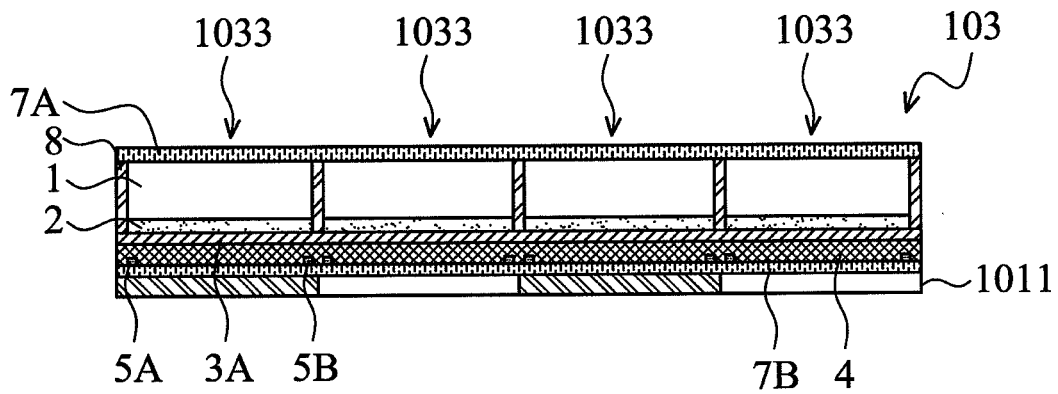

As shown in FIG. 32, the electronically switchable light modulating cells 1033 of FIG. 23 may be arranged in an array to form a light modulating device 103. In addition, several color filters of one pixel 1011 are formed under the substrate 7B, and each of the color filters of the pixel 1011 corresponds to one of the electronically switchable light modulating cells 1033, respectively. In other words, one pixel corresponds to several electronically switchable light modulating cells 1033.

Figure 33:
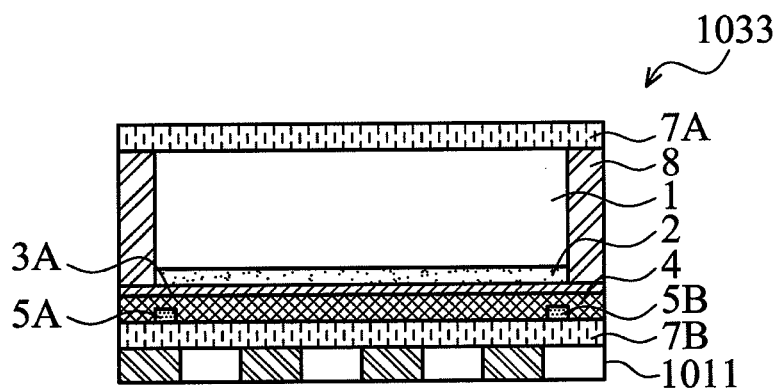

As shown in FIG. 33, an electronically switchable light modulating cell 1033 includes a substrate 7B, spacers 8 over the substrate 7B, and an opposite substrate 7A on the spacers 8 to define a compartment. A top electrode 6U is on the opposite substrate 7A surface. A left electrode 5A and a right electrode 5B are on the substrate 7B. A dielectric layer 4 is formed on the substrate 7B to cover the left electrode 5A and the right electrode 5B, and a high-contact-angle material layer (e.g., a hydrophobic layer) 3A is formed on the dielectric layer 4. A polar light modulating medium 1 and a non-polar light modulating medium 2 are filled into the compartment, and the light modulating mediums are incompatible. As shown in FIG. 33, the spacers 8 are formed on the hydrophobic layer 3A. In addition, several color filters of several pixels 1011 are formed under the substrate 7B, and the pixels 1011 correspond to one of the electronically switchable light modulating cells 1033. In other words, several pixels correspond to one electronically switchable light modulating cells 1033.

Figure 34:
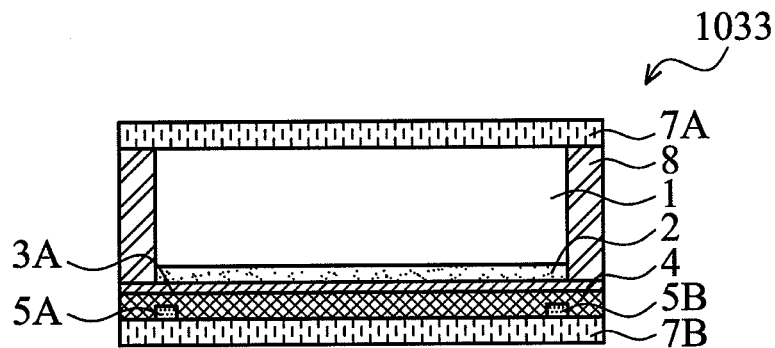

As shown in FIG. 34, an electronically switchable light modulating cell 1033 includes a substrate 7B, spacers 8 over the substrate 7B, and an opposite substrate 7A on the spacers 8 to define a compartment. A left electrode 5A and a right electrode 5B are on the substrate 7B. In addition, the left electrode 5A and the right electrode 5B may be formed on the same level or different levels of the substrate 7B. A dielectric layer 4 is formed on the substrate 7B to cover the left electrode 5A and the right electrode 5B, and a gradient high-contact-angle material layer (e.g., a hydrophobic layer) 3A is formed on the dielectric layer 4. A polar light modulating medium 1 and a non-polar light modulating medium 2 are filled into the compartment, and the light modulating mediums are incompatible. As shown in FIG. 34, the spacers 8 are formed on the gradient hydrophobic layer 3A. In one embodiment, the hydrophobic layer 3A is formed in a gradient manner which continuously increases or decreases in hydrophobicity from the center of the hydrophobic layer 3A to the peripheral of the hydrophobic layer 3A.

Figure 35:
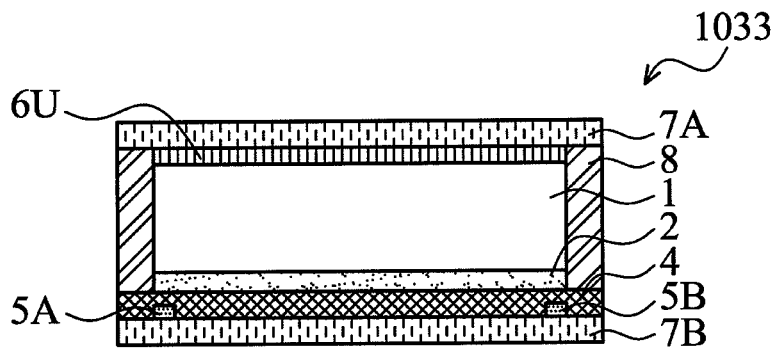

As shown in FIG. 35, an electronically switchable light modulating cell 1033 includes a substrate 7B, spacers 8 over the substrate 7B, and an opposite substrate 7A on the spacers 8 to define a compartment. A top electrode 6U is on the opposite substrate 7A surface. A left electrode 5A and a right electrode 5B are on the substrate 7B. In addition, the left electrode 5A and the right electrode 5B may be disposed on the same level or different levels of the substrate 7B. A dielectric layer 4 is formed on the substrate 7B to cover the left electrodes 5A and the right electrodes 5B. A polar light modulating medium 1 and a non-polar light modulating medium 2 are filled into the compartment, and the light modulating mediums are incompatible. As shown in FIG. 35, the spacers 8 are formed on the dielectric layer 4.

Figure 36:
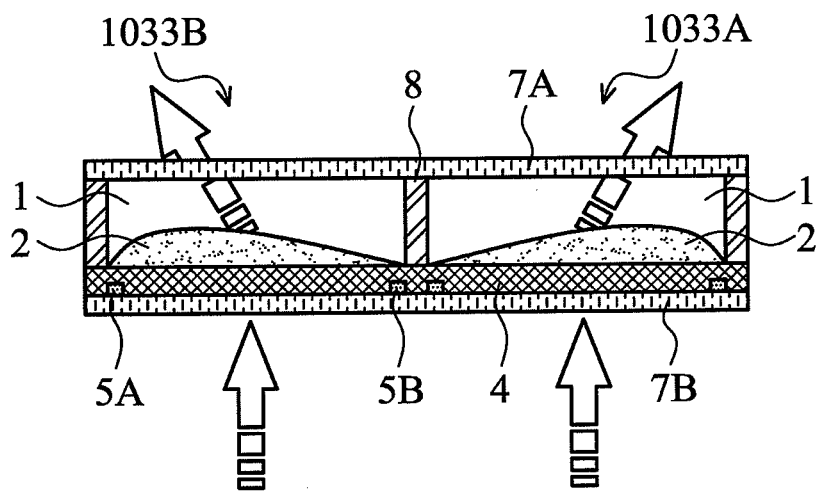

As shown in FIG. 36, two adjacent electronically switchable light modulating cells 1033A and 1033B include a substrate 7B, spacers 8 on the substrate 7B, and an opposite substrate 7A on the spacers 8 to define two adjacent compartments. Two left electrodes 5A and two right electrodes 5B are on the substrate 7B of the two compartments, respectively. A dielectric layer 4 is formed on the substrate 7B to cover the left electrodes 5A and the right electrodes 5B. As shown in FIG. 36, the spacers 8 are formed on the dielectric layer 4. A polar light modulating medium 1 and a non-polar light modulating medium 2 are filled into the two compartments, and the light modulating mediums are incompatible. In this embodiment, the two electronically switchable light modulating cells 1033A and 1033B may deflect the left eye images and the right eye images to the left eye and the right eye of the viewer, respectively during the same time period, respectively, without using the time-sharing mode as shown in FIG. 3.

Figure 37:
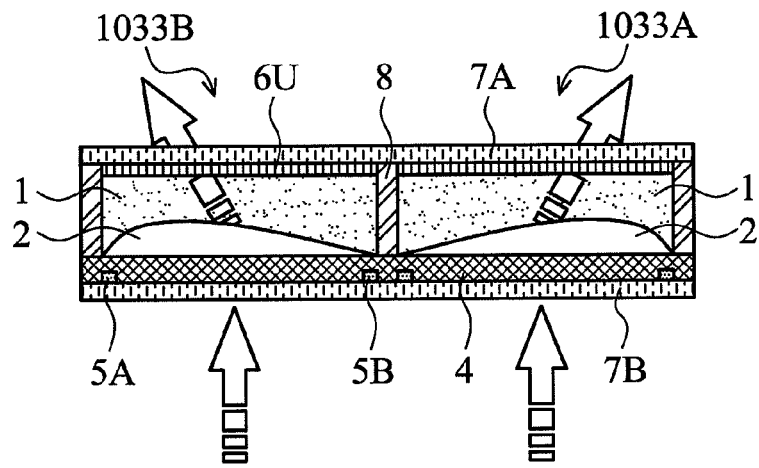

As shown in FIG. 37, two adjacent electronically switchable light modulating cells 1033A and 1033B include a substrate 7B, spacers 8 over the substrate 7B, and an opposite substrate 7A on the spacers 8 to define two adjacent compartments. Two top electrodes 6U are on the opposite substrate 7A surface of the two compartments, respectively. Two left electrodes 5A and two right electrodes 5B are on the substrate 7B of the two compartments, respectively. A dielectric layer 4 is formed on the substrate 7B to cover the left electrodes 5A and the right electrodes 5B. As shown in FIG. 37, the spacers 8 are formed on the dielectric layer 4. A polar light modulating medium 1 and a non-polar light modulating medium 2 are filled into the two compartments, and the light modulating mediums are incompatible. In this embodiment, the two electronically switchable light modulating cells 1033A and 1033B may deflect the left eye images and the right eye images to the left eye and the right eye of the viewer, respectively during the same time period, respectively, without using the time-sharing mode as shown in FIG. 3.

Figure 38:
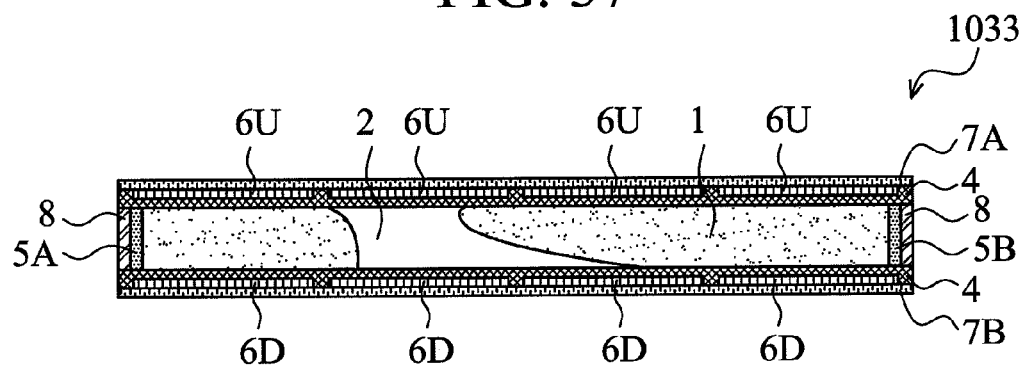

As shown in FIG. 38, the electronically switchable light modulating cell 1033 includes a substrate 7B, spacers 8 over the substrate 7B, and an opposite substrate 7A on the spacers 8 to define a compartment. A left electrode 5A and a right electrode 5B are on the left and right spacers 8, respectively. Top electrodes 6U and bottom electrodes 6D are on the opposite substrate 7A surface and the substrate 7B surface, respectively. Two dielectric layers 4 are formed on the substrate 7A and the substrate 7B, respectively. A polar light modulating medium 1 and a non-polar light modulating medium 2 are filled into the compartment, and the light modulating mediums are incompatible. As shown in FIG. 38, the cross-section of the electronically switchable light modulating cell 1033 is rectangular-shaped, and the spacers 8 are perpendicular to the substrate 7B and the opposite substrate 7A. In addition, the spacers 8 are formed on the dielectric layer 4 on the substrate 7B, and the dielectric layer 4 on the opposite substrate 7A is formed on the spacers 8. Because the distance between the substrate 7B and the opposite substrate 7A is short and/or the ratio of the non-polar light modulating medium 2 to the polar light modulating medium 1 is high, the non-polar light modulating medium 2 may simultaneously contact the substrate 7B and the opposite substrate 7A. The shape of the non-polar light modulating medium 2 can be tuned by applying different voltages to the top electrodes 6U, the bottom electrodes 6D, the left electrode 5A, and the right electrode 5B.

Figure 39:
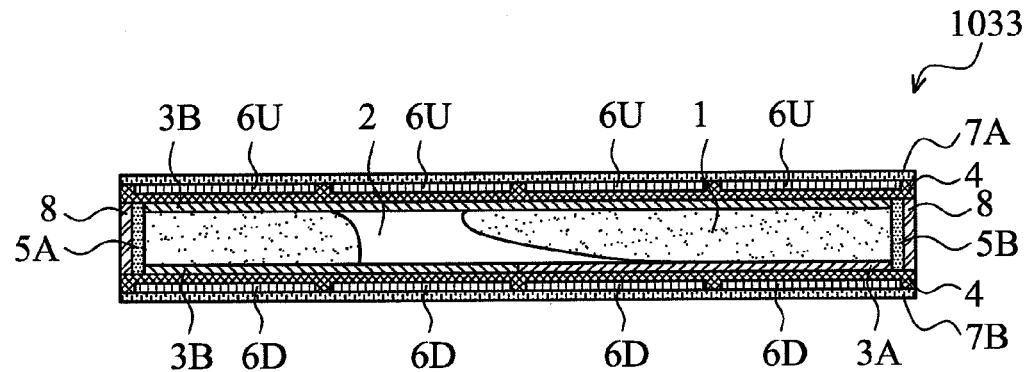

As shown in FIG. 39, the electronically switchable light modulating cell 1033 includes a substrate 7B, spacers 8 over the substrate 7B, and an opposite substrate 7A on the spacers 8 to define a compartment. A left electrode 5A and a right electrode 5B are on the left and right spacers 8, respectively. Top electrodes 6U and bottom electrodes 6D are on the opposite substrate 7A surface and the substrate 7B surface, respectively. Two dielectric layers 4 are formed on the substrate 7A and the substrate 7B, respectively. A low-contact-angle material layer (e.g., a hydrophilic layer 3B) and a hydrophobic layer 3A are formed on the dielectric layer 4 on the substrate 7B. Another hydrophilic layer 3B is formed on the dielectric layer 4 on the opposite substrate 7B. A polar light modulating medium 1 and a non-polar light modulating medium 2 are filled into the compartment, and the light modulating mediums are incompatible. As shown in FIG. 39, the cross-section of the electronically switchable light modulating cell 1033 is rectangular-shaped, and the spacers 8 are perpendicular to the substrate 7B and the opposite substrate 7A. In addition, the spacers 8 are formed on the hydrophilic layer 3B and the hydrophobic layer 3A on different sides of the substrate 7B, and the hydrophilic layer 3B on the opposite substrate 7A is formed on the spacers 8. Because the distance between the substrate 7B and the opposite substrate 7A is short and/or the ratio of the non-polar light modulating medium 2 to the polar light modulating medium 1 is high, the non-polar light modulating medium 2 may simultaneously contact the substrate 7B and the opposite substrate 7A. The shape of the non-polar light modulating medium 2 can be tuned by applying different voltages to the top electrodes 6U, the bottom electrodes 6D, the left electrode 5A, and the right electrode 5B.

Figure 40:
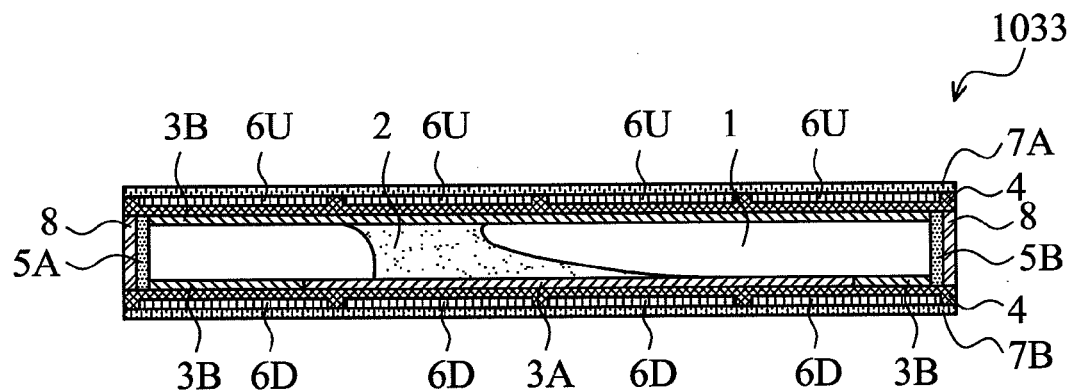

As shown in FIG. 40, the electronically switchable light modulating cell 1033 includes a substrate 7B, spacers 8 over the substrate 7B, and an opposite substrate 7A on the spacers 8 to define a compartment. A left electrode 5A and a right electrode 5B are on the left and right spacers 8, respectively. Top electrodes 6U and bottom electrodes 6D are on the opposite substrate 7A surface and the substrate 7B surface, respectively. Two dielectric layers 4 are formed on the substrate 7A and the substrate 7B, respectively. A low-contact-angle material layer (e.g., a hydrophilic layer 3B) and a high-contact-angle material layer (e.g., a hydrophobic layer 3A) are formed on the dielectric layer 4 on the substrate 7B, and the hydrophobic layer 3A is surrounded by the hydrophilic layer 3B. Another hydrophobic layer 3A is formed on the dielectric layer 4 on the opposite substrate 7A. A polar light modulating medium 1 and a non-polar light modulating medium 2 are filled into the compartment, and the light modulating mediums are incompatible. As shown in FIG. 40, the cross-section of the electronically switchable light modulating cell 1033 is rectangular, and the spacers 8 are perpendicular to the substrate 7B and the opposite substrate 7A. In addition, the spacers 8 are formed on the hydrophilic layer 3B on the substrate 7B, and the hydrophilic layer 3B on the opposite substrate 7A is formed on the spacers 8. Because the distance between the substrate 7B and the opposite substrate 7A is short and/or the ratio of the non-polar light modulating medium 2 to the polar light modulating medium 1 is high, the non-polar light modulating medium 2 may simultaneously contact the substrate 7B and the opposite substrate 7A. The shape of the non-polar light modulating medium 2 can be tuned by applying different voltages to the top electrodes 6U, the bottom electrodes 6D, the left electrode 5A, and the right electrode 5B.

Figure 41:
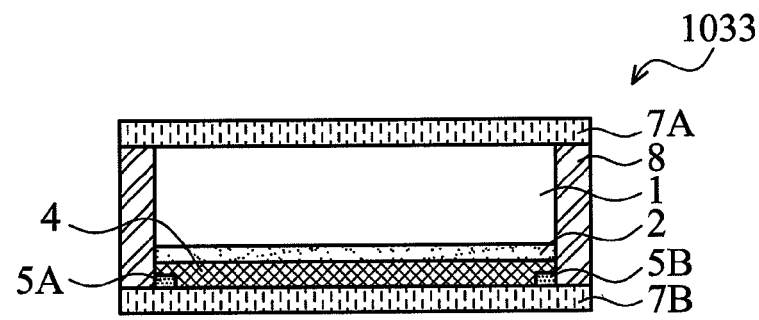

As shown in FIG. 41, an electronically switchable light modulating cell 1033 includes a substrate 7B, spacers 8 on the substrate 7B, and an opposite substrate 7A on the spacers 8 to define a compartment. A left electrode 5A and a right electrode 5B are on the substrate 7B. In addition, the left electrode 5A and the right electrode 5B may be formed on the same level or different levels of the substrate 7B. A dielectric layer 4 is formed on the substrate 7B to cover the left electrodes 5A and the right electrodes 5B. A polar light modulating medium 1 and a non-polar light modulating medium 2 are filled into the compartment, and the light modulating mediums are incompatible.

Figure 42:
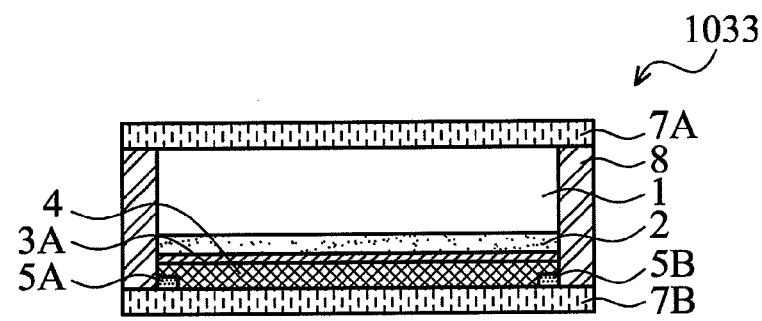

As shown in FIG. 42, an electronically switchable light modulating cell 1033 includes a substrate 7B, spacers 8 on the substrate 7B, and an opposite substrate 7A on the spacers 8 to define a compartment. A left electrode 5A and a right electrode 5B are on the substrate 7B. In addition, the left electrode 5A and the right electrode 5B may be disposed on the same level or different levels of the substrate 7B. A dielectric layer 4 is formed on the substrate 7B to cover the left electrodes 5A and the right electrodes 5B, and a high-contact-angle material layer (e.g., a hydrophobic layer) 3A is formed on the dielectric layer 4. A polar light modulating medium 1 and a non-polar light modulating medium 2 are filled into the compartment, and the light modulating mediums are incompatible.

Figure 43:
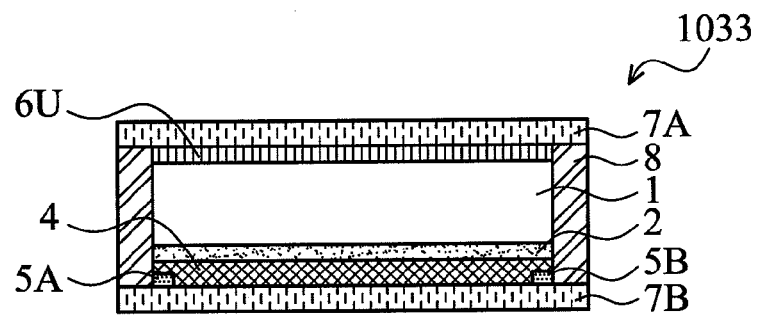

As shown in FIG. 43, an electronically switchable light modulating cell 1033 includes a substrate 7B, spacers 8 on the substrate 7B, and an opposite substrate 7A on the spacers 8 to define a compartment. A top electrode 6U is on the opposite substrate 7A surface. A left electrode 5A and a right electrode 5B are on the substrate 7B. In addition, the left electrode 5A and the right electrode 5B may be formed on the same level or different levels of the substrate 7B. A dielectric layer 4 is formed on the substrate 7B to cover the left electrodes 5A and the right electrodes 5B. A polar light modulating medium 1 and a non-polar light modulating medium 2 are filled into the compartment, and the light modulating mediums are incompatible.

Figure 44:
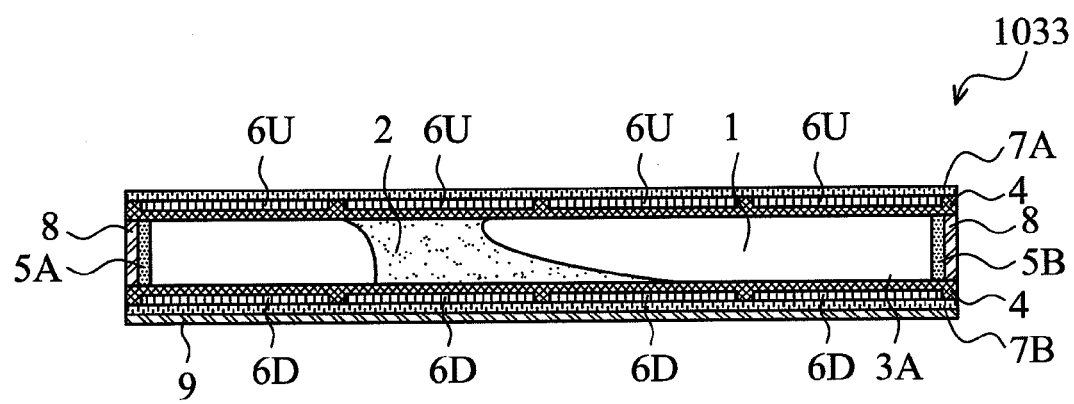

As shown in FIG. 44, one pixel 1011 of a single color is formed under the substrate 7B of the electronically switchable light modulating cell 1033 in FIG. 38. In other words, one pixel corresponds to one electronically switchable light modulating cells 1033.

Figure 45:
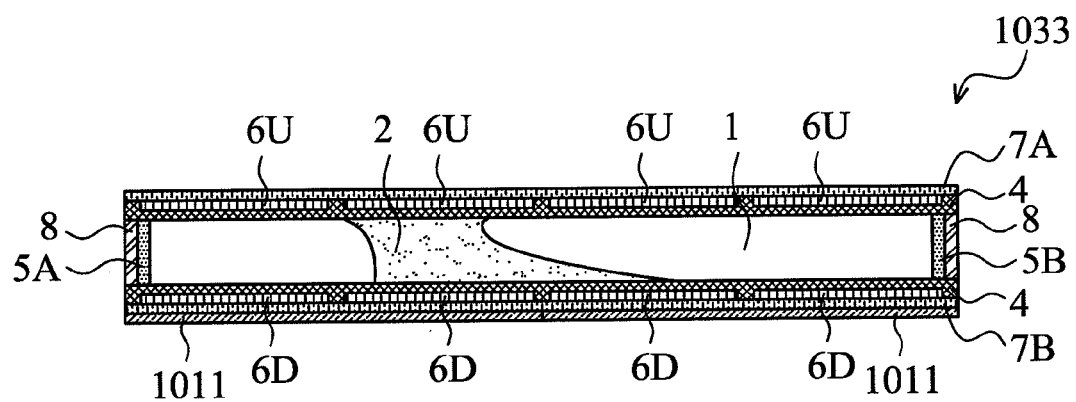

As shown in FIG. 45, two pixels 1011 of different colors are formed under the substrate 7B of the electronically switchable light modulating cell 1033 in FIG. 38. In other words, at least two pixels correspond to one electronically switchable light modulating cells 1033.

Figure 46:
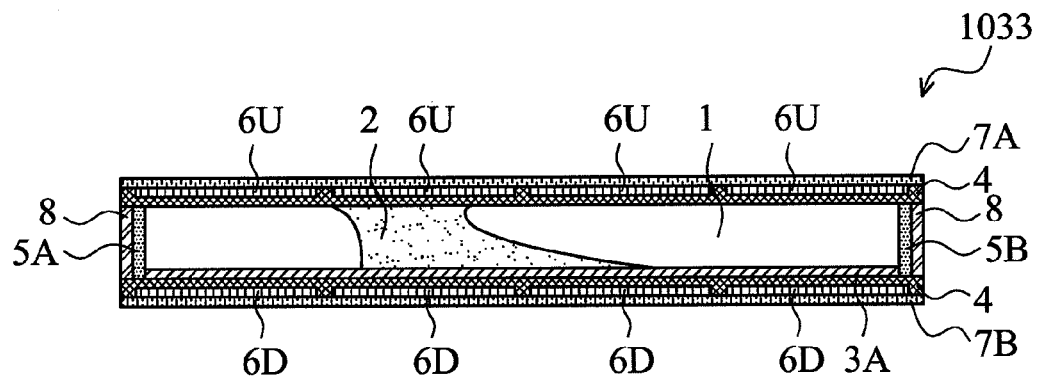

As shown in FIG. 46, the electronically switchable light modulating cell 1033 includes a substrate 7B, spacers 8 over the substrate 7B, and an opposite substrate 7A on the spacers 8 to define a compartment. A left electrode 5A and a right electrode 5B are on the left and right spacers 8, respectively. Top electrodes 6U and bottom electrodes 6D are on the opposite substrate 7A surface and the substrate 7B surface, respectively. Two dielectric layers 4 are formed on the substrate 7A and the substrate 7B, respectively. A hydrophobic layer 3A is formed on the dielectric layer 4 on the substrate 7B. A polar light modulating medium 1 and a non-polar light modulating medium 2 are filled into the compartment, and the light modulating mediums are incompatible. As shown in FIG. 46, the cross-section of the electronically switchable light modulating cell 1033 is rectangular, and the spacers 8 are perpendicular to the substrate 7B and the opposite substrate 7A. In addition, the spacers 8 are formed on the dielectric layer 4 on the substrate 7B, and the dielectric layer 4 on the opposite substrate 7A is formed on the spacers 8. Because the distance between the substrate 7B and the opposite substrate 7A is short and/or the ratio of the non-polar light modulating medium 2 to the polar light modulating medium 1 is high, the non-polar light modulating medium 2 may simultaneously contact the substrate 7B and the opposite substrate 7A. The shape of the non-polar light modulating medium 2 can be tuned by applying different voltages to the top electrodes 6U, the bottom electrodes 6D, the left electrode 5A, and the right electrode 5B.

Figure 47:
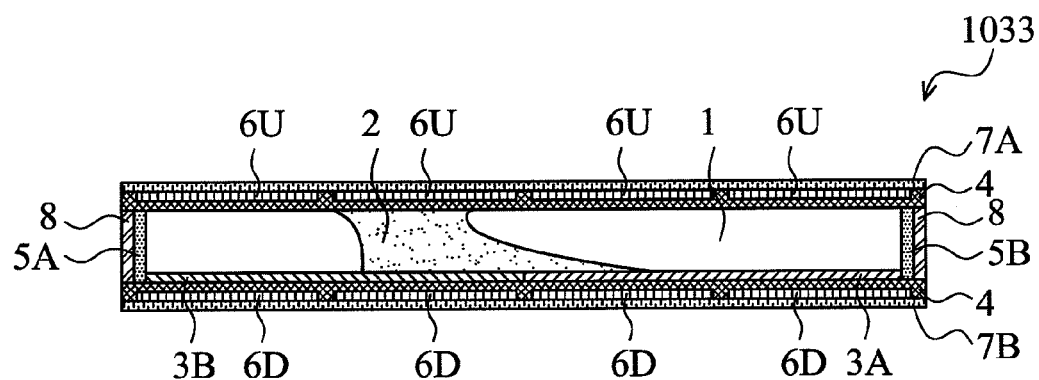

As shown in FIG. 47, the electronically switchable light modulating cell 1033 includes a substrate 7B, spacers 8 over the substrate 7B, and an opposite substrate 7A on the spacers 8 to define a compartment. A left electrode 5A and a right electrode 5B are on the left and right spacers 8, respectively. Top electrodes 6U and bottom electrodes 6D are on the opposite substrate 7A surface and the substrate 7B surface, respectively. Two dielectric layers 4 are formed on the substrate 7A and the substrate 7B, respectively. A low-contact-angle material layer (e.g., a hydrophilic layer) 3B and a hydrophobic layer 3A are formed on the dielectric layer 4 on the substrate 7B. A polar light modulating medium 1 and a non-polar light modulating medium 2 are filled into the compartment, and the light modulating mediums are incompatible. As shown in FIG. 47, the cross-section of the electronically switchable light modulating cell 1033 is rectangular, and the spacers 8 are perpendicular to the substrate 7B and the opposite substrate 7A. In addition, the spacers 8 are formed on the dielectric layer 4 on the substrate 7B, and the dielectric layer 4 on the opposite substrate 7A is formed on the spacers 8. Because the distance between the substrate 7B and the opposite substrate 7A is short and/or the ratio of the non-polar light modulating medium 2 to the polar light modulating medium 1 is high, the non-polar light modulating medium 2 may simultaneously contact the substrate 7B and the opposite substrate 7A. The shape of the non-polar light modulating medium 2 can be tuned by applying different voltages to the top electrodes 6U, the bottom electrodes 6D, the left electrode 5A, and the right electrode 5B.

Figure 48:
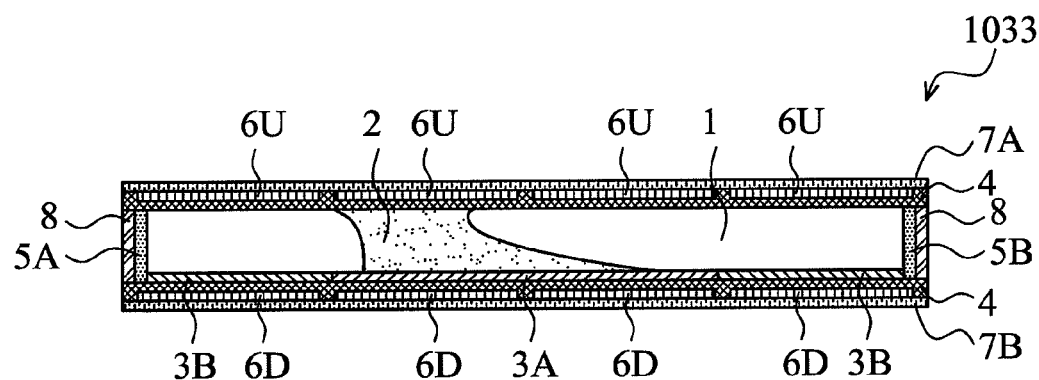

As shown in FIG. 48, the electronically switchable light modulating cell 1033 includes a substrate 7B, spacers 8 over the substrate 7B, and an opposite substrate 7A on the spacers 8 to define a compartment. A left electrode 5A and a right electrode 5B are on the left and right spacers 8, respectively. Top electrodes 6U and bottom electrodes 6D are on the opposite substrate 7A surface and the substrate 7B surface, respectively. Two dielectric layers 4 are formed on the substrate 7A and the substrate 7B, respectively. A low-contact-angle material layer (e.g., a hydrophilic layer 3B) and a hydrophobic layer 3A are formed on the dielectric layer 4 on the substrate 7B, and the hydrophobic layer 3A is surrounded by the hydrophilic layer 3B. A polar light modulating medium 1 and a non-polar light modulating medium 2 are filled into the compartment, and the light modulating mediums are incompatible. As shown in FIG. 48, the cross-section of the electronically switchable light modulating cell 1033 is rectangular-shaped, and the spacers 8 are perpendicular to the substrate 7B and the opposite substrate 7A. In addition, the spacers 8 are formed on the dielectric layer 4 on the substrate 7B, and the dielectric layer 4 on the opposite substrate 7A is formed on the spacers 8. Because the distance between the substrate 7B and the opposite substrate 7A is short and/or the ratio of the non-polar light modulating medium 2 to the polar light modulating medium 1 is high, the non-polar light modulating medium 2 may simultaneously contact the substrate 7B and the opposite substrate 7A. The shape of the non-polar light modulating medium 2 can be tuned by applying different voltages to the top electrodes 6U, the bottom electrodes 6D, the left electrode 5A, and the right electrode 5B.

Figure 49:
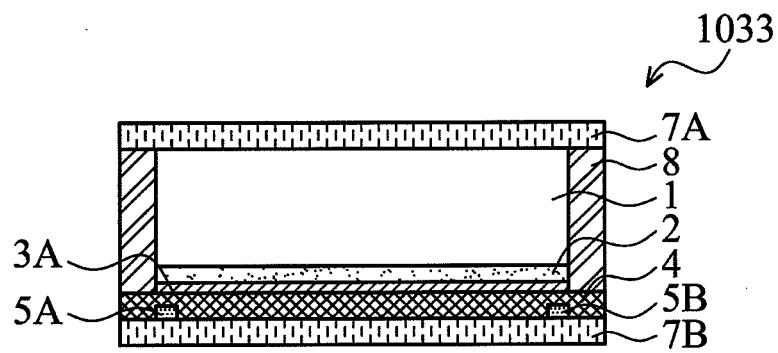

As shown in FIG. 49, an electronically switchable light modulating cell 1033 includes a substrate 7B, spacers 8 over the substrate 7B, and an opposite substrate 7A on the spacers 8 to define a compartment. A left electrode 5A and a right electrode 5B are on the substrate 7B. In addition, the left electrode 5A and the right electrode 5B may be disposed on the same level or different levels of the substrate 7B. A dielectric layer 4 is formed on the substrate 7B to cover the left electrode 5A and the right electrode 5B, and a gradient high-contact-angle material layer (e.g., a hydrophobic layer) 3A is formed on the dielectric layer 4. A polar light modulating medium 1 and a non-polar light modulating medium 2 are filled into the compartment, and the light modulating mediums are incompatible. As shown in FIG. 49, the spacers 8 are formed on the dielectric layer 4. In one embodiment, the hydrophobic layer 3A is formed in a gradient manner which continuously increases or decreases in hydrophobicity from the center of the hydrophobic layer 3A to the peripheral of the hydrophobic layer 3A.

Figure 50:
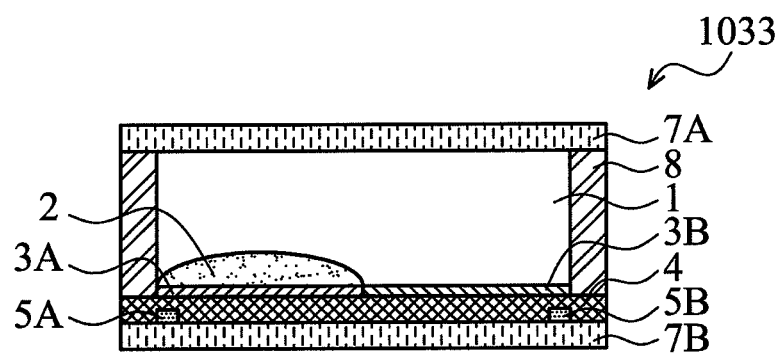

As shown in FIG. 50, an electronically switchable light modulating cell 1033 includes a substrate 7B, spacers 8 over the substrate 7B, and an opposite substrate 7A on the spacers 8 to define a compartment. A left electrode 5A and a right electrode 5B are on the substrate 7B. In addition, the left electrode 5A and the right electrode 5B may be formed on the same level or different levels of the substrate 7B. A dielectric layer 4 is formed on the substrate 7B to cover the left electrode 5A and the right electrode 5B, and a high-contact-angle material layer (e.g., a hydrophobic layer) 3A and a low-contact-angle material layer (e.g., a hydrophilic layer) 3B are formed on the dielectric layer 4. A polar light modulating medium 1 and a non-polar light modulating medium 2 are filled into the compartment, and the light modulating mediums are incompatible. The hydrophobic layer 3A is formed adjacent to the hydrophilic layer 3B. As shown in FIG. 50, the hydrophobic layer 3A and the hydrophilic layer 3B have similar area with a symmetrical pattern. In addition, the spacers 8 are formed on the dielectric layer 4.

Figure 51:
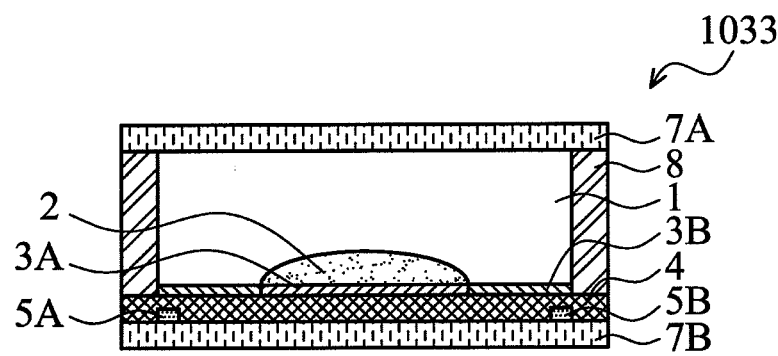

As shown in FIG. 51, an electronically switchable light modulating cell 1033 includes a substrate 7B, spacers 8 over the substrate 7B, and an opposite substrate 7A on the spacers 8 to define a compartment. A left electrode 5A and a right electrode 5B are on the substrate 7B. A dielectric layer 4 is formed on the substrate 7B to cover the left electrode 5A and the right electrode 5B, and a high-contact-angle material layer (e.g., a hydrophobic layer) 3A and a low-contact-angle material layer (e.g., a hydrophilic layer) 3B are formed on the dielectric layer 4. The hydrophobic layer 3A is surrounded by the hydrophilic layer 3B. A polar light modulating medium 1 and a non-polar light modulating medium 2 are filled into the compartment, and the light modulating mediums are incompatible. As shown in FIG. 51, the spacers 8 are formed on the dielectric layer 4. In a further embodiment, the hydrophobic layer 3A is composed of at least two different hydrophobic materials, and/or the hydrophilic layer 3B is composed of at least two different hydrophilic materials. When a profile of the non-polar light modulating medium 2 in the electronically switchable light modulating cell 1033 is changed by the time-sharing mode as shown in FIG. 3, the above design may limit the non-polar light modulating medium 2 to a central region other than a peripheral region of the electronically switchable light modulating cell 1033. As such, the non-polar light modulating medium 2 position is stabilized on the hydrophobic layer 3A surrounded by the hydrophilic layer 3B.

According to the above embodiments, the polar light modulating medium 1 is hydrophilic, such as water, saline, and the like. To increase the conductivity of the polar light modulating medium 1, it can be a low molecular salt solution such as lithium chloride solution or potassium chloride solution. The non-polar light modulating medium 2 is hydrophobic, such as silicone oil, mixture of silicone oil and tetrabromo methane, mineral oil, and hexadecane. Preferably, the non-polar light modulating medium has a viscosity of less than $1000 \times 10^{-6}$ $m^2 \cdot s^{-1}$. In one embodiment of the present invention, for example, toluene can be added to the silicone oil to decrease its viscosity. In a further embodiment, at least one of the polar light modulating medium 1 and the non-polar light modulating medium 2 includes a surfactant such as a halogenated organic compound (e.g. trifluoroethanol or sodium trifluoroacetate). Alternatively, the non-polar light modulating medium 2 can be replaced with a gas, such that the combination of the light modulating mediums can be the polar light modulating medium 1 (e.g. water) and air.

Figure 52:
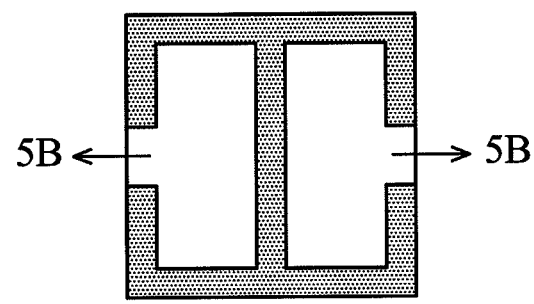
FIGS. 52-54 show patterns of electrodes formed on bottom substrates in electronically switchable light modulating cells according to various embodiments of the present invention.
Figure 53:
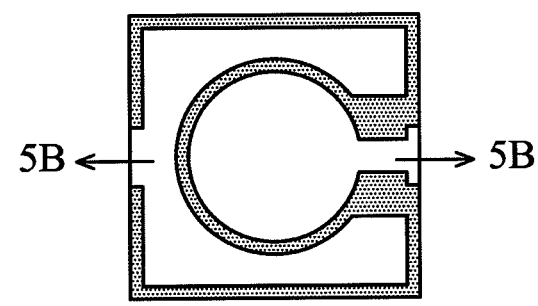
Figure 54:
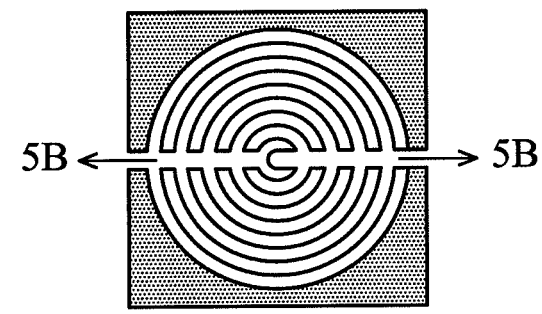

In one embodiment, the electrodes can be, but are not limited to ITO, metal foil, IGZO, and the like. Preferably, the electrode material is transparent, conductive, stable, or has other desirable properties. The pattern of the left electrode 5A and the right electrode 5B on the substrate 7B can be of any suitable geometry pattern. In one embodiment, the left electrode 5A and the left electrode 5B are symmetrical sheets as shown in FIG. 52. In another embodiment, the right electrode 5B is surrounded by the left electrode 5A, as shown in FIG. 53. In an alternative embodiment, the left electrode 5A and the right electrode 5B are spiral-shaped and interlaced with each other, as shown in FIG. 54.

In one embodiment, the dielectric layer 4 has a dielectric constant of 1 to 80 and a thickness of 5 nm to 100 μm, preferably 20 nm to 10 μm. The dielectric layer 4 can be an organic material such as polyimide, Parylene C, Parylene N, or CYTOP (commercially available from Asahi), or an inorganic material such as $Al_2O_3$, $Ta_2O_5$, $SiO_2$, SiN, SiON, or AlON.

The hydrophilicity/hydrophobicity of the dielectric layer 4 surface can be tuned by a surface treatment such as ion implantation, surface plasma modification, and ozone treatment.

The spacers 8 can be transparent or opaque. Optionally, the refractive index of at least one of the polar light modulating medium and the non-polar light modulating medium is matching with the refractive index of the spacers 8, so as to minimize the light scattering effect occurs at the interface between the spacers 8 and the polar light modulating medium or between the spacers 8 and the non-polar light modulating medium. Suitable material of the spacers 8 includes PDMS, parylene, PMMA, $SiO_2$, SU-8 photoresist, KMPR photoresist, or PerMX photoresist, and the like.

Figure 55:
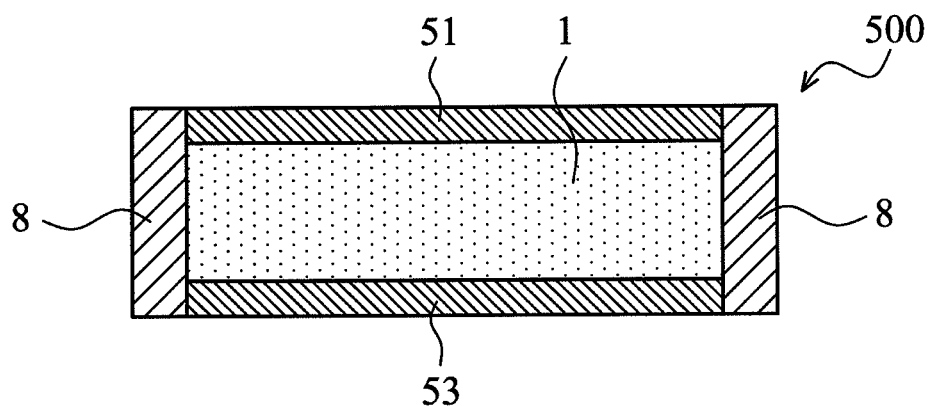
FIGS. 55 and 56 show cross-sections of electronically switchable light modulating cells of the 3D image display devices according to various embodiments of the present invention.
Figure 56:
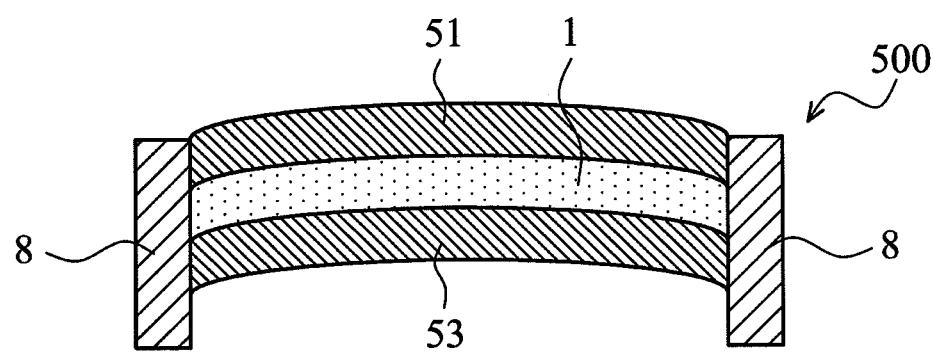

The electronically switchable light modulating cells can be, but not limited, electrowetting cells as mentioned above. For example, the electronically switchable light modulating cells can be electroactive polymer cells. In the electrowetting cells, the light modulating medium shape is tunable in a fixed compartment. In the electroactive polymer cells, the cell shape is not fixed but tunable. As shown in FIG. 55, an electroactive polymer cell 500 includes an electroactive polymer film 51 (served as a top electrode), spacers 8, and another electroactive polymer film 53 (served as a bottom electrode) to define a compartment. A light modulating medium 1 is filled in the compartment. In one embodiment, the electroactive polymer film 51 and/or 53 includes electronic electroactive polymer, such as dielectric electroactive polymer, electrostrictive graft elastomer, electrostrictive paper, electroviscoelastic elastomer, ferroelectric polymer, and liquid crystal elastomer. In another embodiment, the electroactive polymer film 51 and/or 53 includes ionic electroactive polymer, such as ionic polymer gel, ionic polymer metal composite, conducing polymer, and carbon nanotubes. As shown in FIG. 55, when a voltage (e.g. 0V) applied to the first electroactive polymer films 51 is similar to a voltage (e.g. 0V) applied to the second electroactive polymer film 53, the electroactive polymer cell 500 has a flat shape. As shown in FIG. 56, when a voltage (e.g. >0V) applied to the first electroactive polymer films 51 is greater than a voltage (e.g. 0V) applied to the second electroactive polymer film 53, the electroactive polymer cell 500 has a curved shape. The metal ions in the electroactive polymer film 51 are moved by the electric filed of the voltage difference between the electroactive polymer films 51 and 53, thereby shaping the compartment. Moreover, the curvature of the curved compartment depends on the voltage difference between the electroactive polymer films 51 and 53.

Figure 57:
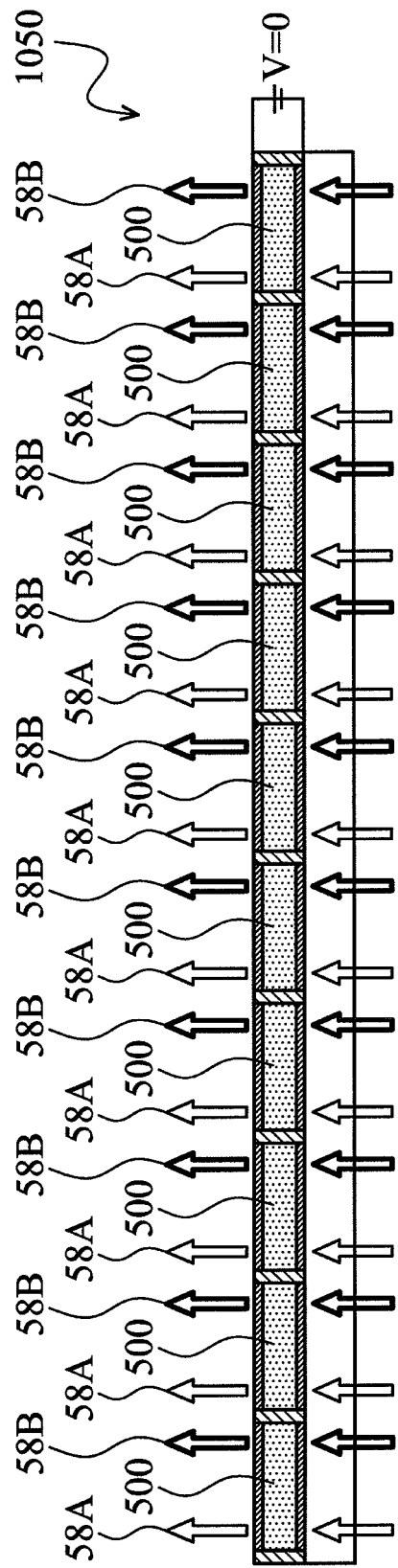
FIGS. 57 and 58 show cross-sections of the 3D image display devices according to various embodiments of the present invention.
Figure 58:
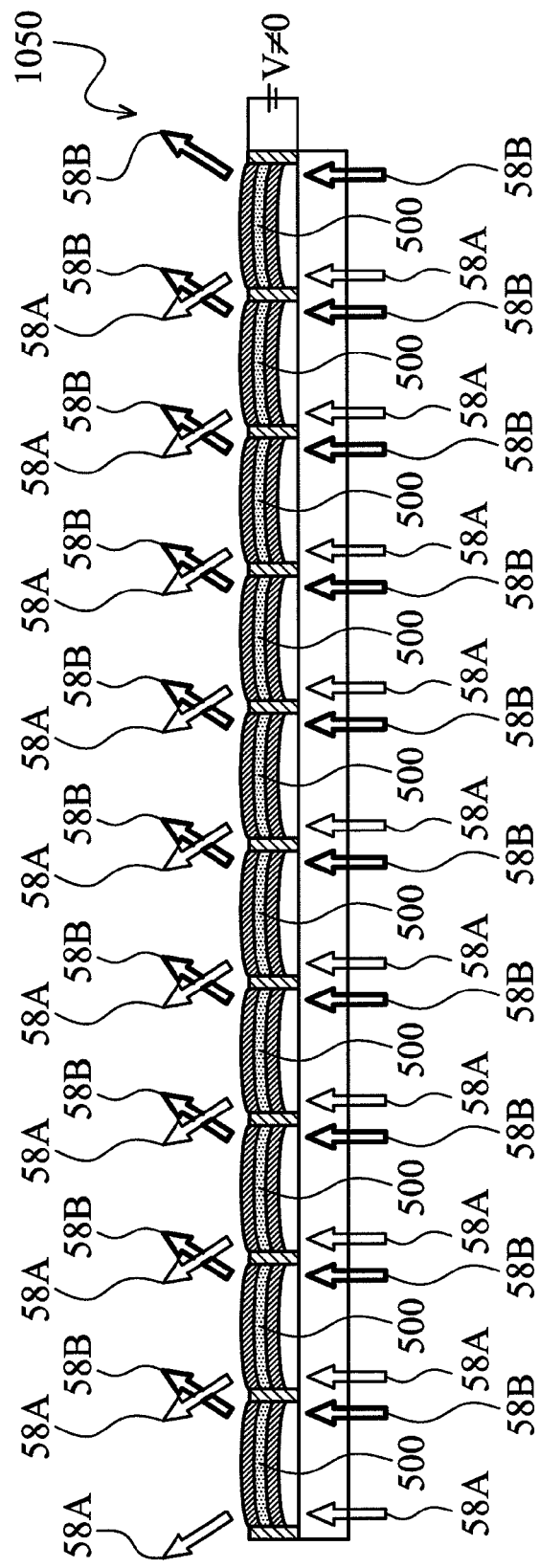

As shown in FIG. 57, the electronically switchable light modulating cells 500 of FIG. 55 can be arranged in an array to form a light modulating device 1050. When the voltages applied to the electroactive polymer films 51 and 53 are similar, the light modulating device 1050 shows 2D images composed of right and left eye images (usually same images) 58A and 58B. When the voltages applied to the electroactive polymer films 51 and 53 are different, the electronically switchable light modulating cells 500 in the light modulating device 1050 are curved as shown in FIG. 58, such that the right and left eye images (usually different images) 58A and 58B are deflected to the left and right eye of a viewer, respectively.

Figure 59A:
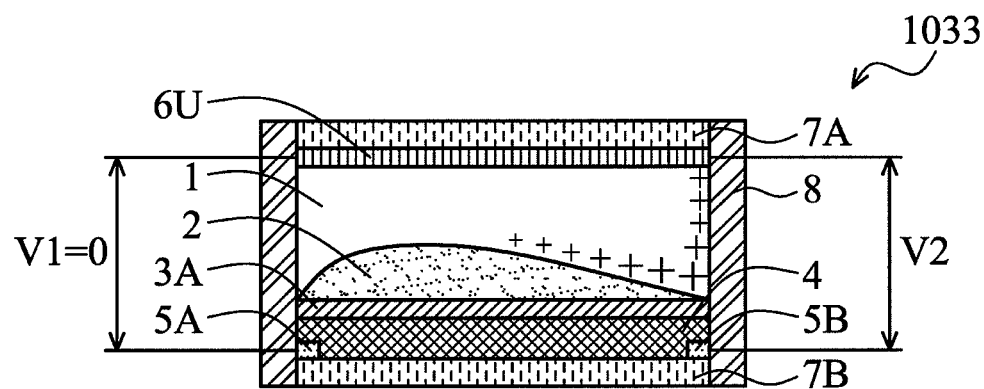
FIGS. 59A and 59B show cross-sections of the 3D image display devices according to various embodiments of the present invention.
Figure 59B:
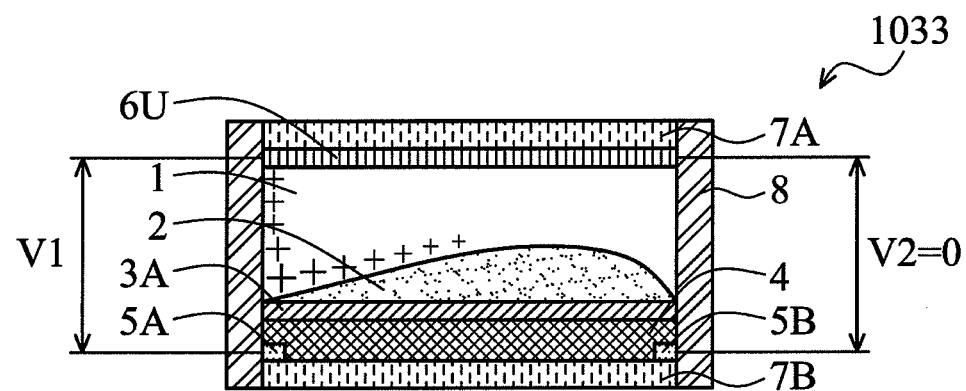

As shown in FIGS. 59A and 59B, an electronically switchable light modulating cell 1033 includes a substrate 7B and an opposite substrate 7A disposed between two spacers 8 to define a compartment. A left electrode 5A and a right electrode 5B are on the substrate 7B. In addition, the left electrode 5A and the right electrode 5B may be disposed on the same level or different levels of the substrate 7B. A dielectric layer 4 is formed on the substrate 7B to cover the left electrode 5A and the right electrode 5B, and a high-contact-angle material layer (e.g., a hydrophobic layer) 3A is formed on the dielectric layer 4. A top electrode 6U is formed on the opposite substrate 7A. A polar light modulating medium 1 and a non-polar light modulating medium 2 are filled into the compartment, and the light modulating mediums 1 and 2 are incompatible. The voltage difference between the electrode 5A and the top electrode 6U at time t1 may attract the polar light modulating medium 1 and repel the non-polar light modulating medium 2 as shown in FIG. 59A, such that the left eye image is deflected to the left eye. Similarly, the voltage difference between the electrode 5B and the top electrode 6U at time t2 may attract the polar light modulating medium 1 and repel the non-polar light modulating medium 2 as shown in 59B, such that the right eye image is deflected to the right eye.

While the invention has been described by way of example and in terms of the preferred embodiments, it is to be understood that the invention is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. An electronically switchable light modulating cell, comprising:
    a first substrate;
    a spacer disposed on the first substrate;
    a second substrate disposed on the spacer and opposite to the first substrate, wherein the first substrate, the second substrate and the spacer define a compartment;
    a first electrode disposed on a portion of the spacer;
    a second electrode disposed on another portion of the spacer;
    a third electrode disposed on the second substrate;
    a dielectric layer formed on the first and second electrodes; and
    a first light modulating medium filled in the compartment and adapted to adjust the directions of light beams traveling from the first substrate to the second substrate in accordance with an electric potential difference across the first, second and third electrodes, so that the light beams alternately arrive at either the left eye or the right eye of a viewer to form a stereoscopic image perceivable to the viewer.

2. The electronically switchable light modulating cell of claim 1, further comprising a high-contact-angle material layer formed on the dielectric layer.

3. The electronically switchable light modulating cell of claim 1, further comprising a second light modulating medium filled in the compartment, wherein the first light modulating medium and the second light modulating medium are substantially incompatible, and wherein a refractive index of the first light modulating medium is different from that of the second light modulating medium.

4. The electronically switchable light modulating cell of claim 1, wherein the first light modulating medium is adapted to form a droplet, wherein the focal length of the droplet is adjustable in accordance with the electric potential difference across the first, second, and third electrodes.

5. The electronically switchable light modulating cell of claim 2, wherein the surface energy of the high-contact-angle material layer varies in a gradient manner.

6. The electronically switchable light modulating cell of claim 1, wherein the spacer is perpendicular or inclined to the first and second substrates.

7. An image display device, comprising:
    a first substrate;
    a pair of first electrodes disposed on the first substrate;
    a pair of second electrodes disposed on the first substrate;
    a dielectric layer, formed on the first substrate, covering the pair of first electrodes and the pair of second electrodes;
    a high-contact-angle material layer formed on the dielectric layer;
    a spacer disposed on the high-contact-angle material layer;
    a second substrate disposed on the spacer and opposite to the first substrate, wherein the high-contact-angle material layer, the second substrate and the spacer define a first compartment and a second compartment;
    a third electrode formed on the second substrate in the first compartment;
    a forth electrode formed on the second substrate in the second compartment;
    a first light modulating medium filled in the first compartment and adapted to adjust the directions of light beams traveling from the first substrate to the second substrate in accordance with an electric potential difference across the pair of first electrodes and the third electrode, so that the light beams arrive at the right eye of a viewer; and
    a second light modulating medium filled in the second compartment and adapted to adjust the directions of light beams traveling from the first substrate to the second substrate in accordance with another electric potential difference across the pair of second electrodes and forth electrode, so that the light beams arrive at the left eye of the viewer and, together with the light beams arriving at the right eye of the view, form a stereoscopic image perceivable to the viewer.

8. The image display device of claim 7, wherein the pair of first electrodes comprise sheet conductive material.

9. The image display device of claim 7, wherein one of the pair of first electrodes is surrounded by the other one of the pair of first electrodes.

10. The image display device of claim 7, wherein the pair of first electrodes are spiral-shaped and interlaced with each other.

11. An electronically switchable light modulating cell, comprising:
    a first substrate;
    a pair of first electrodes disposed on the first substrate, the polarity of one of the pair being different from the polarity of the other;
    a dielectric layer formed on the first substrate and the pair of first electrodes;
    a high-contact-angle material layer formed on the dielectric layer;
    a spacer disposed on the high-contact-angle material layer;
    a second substrate disposed on the spacer and opposite to the first substrate, wherein the high-contact-angle material layer, the second substrate and the spacer define a compartment; and
    a first light modulating medium filled in the compartment and adapted to adjust the directions of light beams traveling from the first substrate to the second substrate in accordance with an electric potential difference across the pair of electrodes and the second electrode, so that the light beams alternately arrive at either the left eye of a viewer or the right eye of the viewer to form a stereoscopic image perceivable to the viewer.

12. The electronically switchable light modulating cell of claim 11, further comprising a color filter attached to the first substrate.

13. The electronically switchable light modulating cell as claimed in claim 11, further comprising a second electrode disposed on the second substrate.

14. The electronically switchable light modulating cell of claim 13, wherein the high-contact-angle material layer has a gradient manner which continuously increases or decreases in hydrophobicity from the center of the high-contact-angle material layer to the peripheral of the high-contact-angle material layer.

15. The electronically switchable light modulating cell of claim 11, wherein the pair of first electrodes are disposed on the same level of the first substrate.

16. The electronically switchable light modulating cell of claim 11, further comprising a second light modulating medium filled in the compartment, wherein the first light modulating medium and the second light modulating medium are substantially incompatible, and wherein the refractive index of the first light modulating medium is different from that of the second light modulating medium.

17. The electronically switchable light modulating cell as claimed in claim 11, wherein the high-contact-angle material layer is zigzag-shaped or Fresnel lens-shaped.

18. An image display device comprising two electronically switchable light modulating cells of claim 11 stacked together.

19. An electronically switchable light modulating cell, comprising:
- a first substrate;
- a pair of first electrodes disposed on the first substrate, wherein at least one of the pair of electrodes is wave-shaped;
- a dielectric layer formed on the first substrate and the pair of first electrodes;
- a high-contact-angle material layer formed on the dielectric layer;
- a spacer disposed on the high-contact-angle material layer;
- a second substrate disposed on the spacer and opposite to the first substrate, wherein the high-contact-angle material layer, the second substrate and the spacer define a compartment;
- a second electrode disposed on the second substrate; and
- a light modulating medium filled in the compartment and adapted to adjust the directions of light beams traveling from the first substrate to the second substrate in accordance with an electric potential difference across the pair of first electrodes and the second electrode, so that the light beams alternately arrive at either the left eye of a viewer or the right eye of the viewer to form a stereoscopic image perceivable to the viewer.

20. The electronically switchable light modulating cell of claim 19, further comprising another light modulating medium filled in the compartment, wherein the first light modulating medium and the second light modulating medium are substantially incompatible, and wherein the refractive index of the light modulating medium is different from that of the another light modulating medium.

21. An electronically switchable light modulating cell, comprising:
- a first substrate;
- a pair of first electrodes disposed on the first substrate;
- a dielectric layer formed on the first substrate and the pair of first electrodes;
- a spacer disposed on the dielectric layer;
- a second substrate disposed on the spacer and opposite to the first substrate, wherein the dielectric layer, the second substrate and the spacer define a compartment; and
- a light modulating medium filled in the compartment and adapted to adjust the directions of light beams traveling from the first substrate to the second substrate in accordance with an electric potential difference across the pair of first electrodes, so that the light beams alternately arrive at either the left eye of a viewer or the right eye of the viewer to form a stereoscopic image perceivable to the viewer.

22. The electronically switchable light modulating cell of claim 21, further comprising another light modulating medium filled in the compartment, wherein the light modulating medium and the another light modulating medium are substantially incompatible, and wherein the refractive index of the light modulating medium is different from that of the another light modulating medium.

23. The electronically switchable light modulating cell of claim 21, further comprising a high-contact-angle material layer formed on the dielectric layer.

24. The electronically switchable light modulating cell of claim 23, wherein the high-contact-angle material layer has a gradient manner which continuously increases or decreases in hydrophobicity from the center of the high-contact-angle material layer to the peripheral of the high-contact-angle material layer.

25. The electronically switchable light modulating cell of claim 24, further comprising a low-contact material layer on the dielectric layer, and the high-contact-angle material layer is surrounded by the low-contact-angle material layer.

26. The electronically switchable light modulating cell of claim 24, further comprising a low-contact-angle material layer formed on the dielectric layer, and the high-contact-angle material layer and the low-contact-angle material layer have similar areas with a symmetrical pattern.

27. The electronically switchable light modulating cell of claim 21, further comprising a second electrode on the second substrate.

28. An electronically switchable light modulating cell, comprising:
- a first substrate;
- a spacer disposed on the first substrate;
- a pair of first electrodes disposed on the first substrate, the polarity of one of the pair being different from the polarity of the other;
- a dielectric layer formed on the first substrate and the pair of first electrodes;
- a second substrate disposed on the spacer and opposite to the first substrate, wherein the dielectric layer, the second substrate and the spacer define a compartment; and
- a first light modulating medium filled in the compartment and adapted to adjust the directions of light beams traveling from the first substrate to the second substrate in accordance with an electric potential difference across the pair of first electrodes and the second electrode, so that the light beams alternately arrive at either the left eye of a viewer or the right eye of the viewer to form a stereoscopic image perceivable to the viewer.

29. The electronically switchable light modulating cell of claim 28, further comprising a second light modulating medium filled in the compartment, wherein the first light modulating medium and the second light modulating medium are substantially incompatible, and wherein the refractive index of the first light modulating medium is different from that of the second light modulating medium.

30. The electronically switchable light modulating cell of claim 28, further comprising a second electrode disposed on the second substrate.

31. The electronically switchable light modulating cell of claim 28, further comprising a high-contact-angle material layer formed on the dielectric layer.

32. The electronically switchable light modulating cell of claim 31, further comprising a low-contact material layer disposed on the dielectric layer, and the high-contact-angle material layer is surrounded by the low-contact-angle material layer.

33. The electronically switchable light modulating cell of claim 31, further comprising a low-contact-angle material layer formed on the dielectric layer, and the high-contact-angle material layer and the low-contact-angle material layer have similar areas with a symmetrical pattern.

34. The electronically switchable light modulating cell of claim 31, further comprising a second electrode formed on the second substrate.

35. An electronically switchable light modulating cell, comprising:
- a first substrate;
- a pair of first electrodes disposed on the first substrate;
- a first dielectric layer formed on the first substrate and the pair of first electrodes;

a spacer disposed on the first dielectric layer;
a second dielectric layer disposed on the spacer, wherein the first dielectric layer, the second dielectric layer and the spacer define a compartment;
a pair of second electrodes disposed on the second dielectric layer;
a second substrate, disposed on the second dielectric layer, covering the pair of second electrodes;
a third electrode disposed on a portion of the spacer;
a forth electrode disposed on another portion of the spacer; and
a light modulating medium filled in the compartment, wherein the light modulating medium is adapted to form a capillary droplet and to adjust the directions of light beams traveling from the first substrate to the second substrate in accordance with an electric potential difference across the first pair of electrodes, the second pair of electrodes, the third electrode and the forth electrode, so that the light beams alternately arrive at either the left eye of a viewer or the right eye of the viewer to form a stereoscopic image perceivable to the viewer.

36. The electronically switchable light modulating cell of claim 35, further comprising another light modulating medium filled in the compartment, wherein the light modulating medium and the another light modulating medium are substantially incompatible, and wherein the refractive index of the light modulating medium is different from that of the another light modulating medium.

37. The electronically switchable light modulating cell of claim 35, further comprising low-contact-angle material layers formed on the first dielectric layer and the second dielectric layer, respectively, and a high-contact-angle material layer formed on the first dielectric layer, wherein the high-contact-angle material layer and the low-contact-angle material layer on the first dielectric layer have similar areas with a symmetrical pattern.

38. The electronically switchable light modulating cell of claim 35, further comprising low-contact-angle material layers formed on the first dielectric layer and the second dielectric layer, respectively, and a high-contact-angle material layer formed on the first dielectric layer, wherein the high-contact-angle material layer on the first dielectric layer is surrounded by the low-contact-angle material layer on the first dielectric layer.

39. The electronically switchable light modulating cell of claim 35, further comprising a high-contact-angle material layer formed on the first dielectric layer.

40. The electronically switchable light modulating cell of claim 35, further comprising a low-contact-angle material layer and a high-contact-angle material layer formed on the first dielectric layer, wherein the high-contact-angle material layer and the low-contact-angle material layer have similar areas with a symmetrical pattern.

41. The electronically switchable light modulating cell of claim 35, further comprising a low-contact-angle material layer and a high-contact-angle material layer formed on the first dielectric layer, wherein the high-contact-angle material layer is surrounded by the low-contact-angle material layer.

42. An image display device comprising a color filter and the electronically switchable light modulating cell of claim 35 attached to the color filter.

43. The image display device of claim 42, wherein the color filter comprises two or more pixels.

44. An electronically switchable light modulating cell, comprising:
a first substrate;
a pair of first electrodes disposed on the first substrate;
a first dielectric layer formed on the first substrate and the pair of first electrodes;
a first high-contact-angle material layer formed on the first dielectric layer;
a spacer disposed on the first high-contact-angle material layer;
a second high-contact-angle material layer disposed on the spacer, wherein the first high-contact-angle material layer, the second high-contact-angle material layer, and the spacer define a compartment;
a second dielectric layer formed on the second high-contact-angle material layer;
a pair of second electrodes covered by the second dielectric layer;
a second substrate disposed on the second dielectric layer;
a third electrode disposed on a portion of the spacer;
a forth electrode disposed on another portion of the spacer; and
a light modulating medium filled in the compartment, wherein the light modulating medium is adapted to form a capillary droplet and to adjust the directions of light beams traveling from the first substrate to the second substrate in accordance with an electric potential difference across the first pair of electrodes, the second pair of electrodes, the third electrode and the forth electrode, so that the light beams alternately arrive at either the left eye of a viewer or the right eye of the viewer to form a stereoscopic image perceivable to the viewer.

45. An image display device comprising a color filter having two or more pixels and the electronically switchable light modulating cell of claim 44 attached to the color filter.

46. The electronically switchable light modulating cell of claim 44, further comprising another light modulating medium filled in the compartment, wherein the light modulating medium and the another light modulating medium are substantially incompatible, and wherein the refractive index of the light modulating medium is different from that of the another light modulating medium.

47. An electronically switchable light modulating cell, comprising:
a first electroactive polymer film;
a spacer;
a second electroactive polymer film opposite to the first electroactive polymer film, wherein the first electroactive polymer film, the second electroactive polymer film, and the spacer define a compartment; and
a light modulating medium filled in the compartment, wherein the light modulating medium is adapted to adjust the directions of light beams traveling from the first electroactive polymer film to the second electroactive polymer film in accordance with an electric potential difference across the first electroactive polymer film and the second electroactive polymer film, so that the light beams alternately arrive at either the left eye of a viewer or the right eye of the viewer to form a stereoscopic image perceivable to the viewer.

48. The electronically switchable light modulating cell of claim 47, wherein at least one of the first electroactive polymer film and the second electroactive polymer film comprises electronic electroactive polymer or ionic electroactive polymer.

49. The electronically switchable light modulating cell of claim 47, wherein the light modulating medium comprises dielectric electroactive polymer, electrostrictive graft elastomer, electrostrictive paper, electro-viscoelastic elastomer, ferroelectric polymer, or liquid crystal elastomer.

50. The electronically switchable light modulating cell of claim 47, wherein the ionic electroactive polymer comprises ionic polymer gel, ionic polymer metal composite, conducting polymer, or carbon nanotubes.

51. An electronically switchable light modulating cell, comprising:
    two spacers;
    a first substrate and a second substrate disposed between the two spacers;
    a pair of first electrodes disposed on the first substrate, the polarity of one of the pair being different from the polarity of the other;
    a dielectric layer formed on the first substrate and the pair of first electrodes;
    a second electrode formed on the second substrate;
    a high-contact-angle material layer formed on the dielectric layer, wherein the high-contact-angle material layer, the second electrode and the two spacers define a compartment;
    a first light modulating medium filled in the compartment and adapted to adjust the directions of light beams traveling from the first substrate to the second substrate in accordance with an electric potential difference across the pair of first electrodes and the second electrode, so that the light beams alternately arrive at either the left eye of a viewer or the right eye of the viewer to form a stereoscopic image perceivable to the viewer.

52. The electronically switchable light modulating cell of claim 51, further comprising a second light modulating medium filled in the compartment, wherein the first light modulating medium and the second light modulating medium are substantially incompatible, and wherein the refractive index of the first light modulating medium is different from that of the second light modulating medium.

53. An electronically switchable light modulating cell, comprising:
    a first substrate;
    a high-contact-angle material layer on the first substrate;
    a spacer disposed on the high-contact-angle material layer;
    a second substrate disposed on the spacer and opposite to the first substrate, wherein the high-contact-angle material layer, the second substrate and the spacer define a compartment;
    a first electrode disposed on a portion of the spacer;
    a second electrode disposed on another portion of the spacer;
    a third electrode disposed on the second substrate;
    a dielectric layer formed on the first and second electrodes; and
    a first light modulating medium filled in the compartment and adapted to adjust the directions of light beams traveling from the first substrate to the second substrate in accordance with an electric potential difference across the first, second and third electrodes, so that the light beams alternately arrive at either the left eye or the right eye of a viewer to form a stereoscopic image perceivable to the viewer.

54. An image display device, comprising:
    a color filter having a plurality of pixels; and
    a plurality of electronically switchable light modulating cells of claim 53 arranged in array, wherein each of the electronically switchable light modulating cells corresponds to one pixel of the color filter.

55. The electronically switchable light modulating cell of claim 53, further comprising a second light modulating medium filled in the compartment, wherein the first light modulating medium and the second light modulating medium are substantially incompatible, and wherein the refractive index of the first light modulating medium is different from that of the second light modulating medium.

56. An image display device, comprising:
    a first substrate;
    a pair of first electrodes disposed on the first substrate;
    a pair of second electrodes disposed on the first substrate;
    a dielectric layer, formed on the first substrate, covering the pair of first electrodes and the pair of second electrodes;
    a spacer disposed on the dielectric layer;
    a second substrate disposed on the spacer and opposite to the first substrate, wherein the dielectric layer, the second substrate and the spacer define a first compartment and a second compartment;
    a first light modulating medium filled in the first compartment and adapted to adjust the directions of light beams traveling from the first substrate to the second substrate in accordance with an electric potential difference across the pair of first electrodes, so that the light beams arrive at the right eye of a viewer; and
    a second light modulating medium filled in the second compartment and adapted to adjust the directions of light beams traveling from the first substrate to the second substrate in accordance with another electric potential difference across the pair of second electrodes, so that the light beams arrive at the left eye of the viewer and, together with the light beams arriving at the right eye of the view, form a stereoscopic image perceivable to the viewer.

57. The image display device of claim 56, further comprising a third electrode formed on the second substrate in the first compartment, and a forth electrode formed on the second substrate in the second compartment.

\* \* \* \* \*